(12) United States Patent
Sanford

(10) Patent No.: US 11,586,033 B2
(45) Date of Patent: Feb. 21, 2023

(54) HIGH SPEED VARIABLE FOCAL FIELD LENS ASSEMBLY AND RELATED METHODS

(71) Applicant: Saikou Optics Incorporated, Vero Beach, FL (US)

(72) Inventor: Eric Sanford, Vero Beach, FL (US)

(73) Assignee: Saikou Optics Incorporated, Orlando, FL (US)

( * ) Notice: Subject to any disclaimer, the term of this patent is extended or adjusted under 35 U.S.C. 154(b) by 699 days.

(21) Appl. No.: 16/557,513

(22) Filed: Aug. 30, 2019

(65) Prior Publication Data

US 2019/0384053 A1 Dec. 19, 2019

Related U.S. Application Data

(62) Division of application No. 14/715,202, filed on May 18, 2015, now Pat. No. 10,444,491.

(Continued)

(51) Int. Cl.
*G02B 26/08* (2006.01)
*G02B 7/04* (2021.01)
(Continued)

(52) U.S. Cl.
CPC .......... *G02B 26/0825* (2013.01); *G02B 7/04* (2013.01); *G02B 7/09* (2013.01); *G02B 7/28* (2013.01);
(Continued)

(58) Field of Classification Search
CPC .......... H04N 5/23232; H04N 5/23229; H04N 5/23238; H04N 5/23296; G06T 7/74; G06T 7/001; G02B 26/0825
See application file for complete search history.

(56) References Cited

U.S. PATENT DOCUMENTS

| 4,836,661 A | 6/1989 | Ikemori |
| 6,081,388 A | 6/2000 | Widl |

(Continued)

FOREIGN PATENT DOCUMENTS

| GB | 2 020 445 A | 11/1979 |
| JP | 53-87727 A | 8/1978 |

(Continued)

OTHER PUBLICATIONS

Extended European Search Report, dated Dec. 12, 2017, for European Application No. 15796494.1-1562 / 3146373, 10 pages.

(Continued)

*Primary Examiner* — Nicholas G Giles
(74) *Attorney, Agent, or Firm* — Seed IP Law Group LLP

(57) ABSTRACT

A variable focal length optical assembly may include a deformable entry lens element, a deformable first reflective element and a deformable second reflective element. Using a controller coupled to the deformable elements, an external force such as a mechanical, electrical, electromechanical, or electromagnetic force is applied to the deformable elements to provide any number of different focal lengths. Since the deformation of the deformable elements, and consequently the changes in focal length, occur much faster than the playback frame rate, a number of sub-frames, each containing an image obtained at a different focal length, are associated with each playback frame. The availability of multiple images in the form of sub-frames permits the selection of an optimal image for inclusion in the final playback frame sequence. The availability of multiple images in the form of sub-frames at different focal lengths also permits the seamless incorporation of zoom-in and zoom-out effects.

17 Claims, 17 Drawing Sheets

Related U.S. Application Data

(60) Provisional application No. 62/000,865, filed on May 20, 2014.

(51) Int. Cl.

| | |
|---|---|
| *H04N 5/238* | (2006.01) |
| *H04N 5/232* | (2006.01) |
| *G02B 17/06* | (2006.01) |
| *G02B 7/09* | (2021.01) |
| *G02B 7/28* | (2021.01) |
| *G02B 17/08* | (2006.01) |
| *G06T 7/73* | (2017.01) |
| *G06T 7/00* | (2017.01) |

(52) U.S. Cl.
CPC ..... *G02B 17/0694* (2013.01); *G02B 17/0808* (2013.01); *G02B 17/0896* (2013.01); *G02B 26/0875* (2013.01); *H04N 5/238* (2013.01); *H04N 5/23232* (2013.01); *H04N 5/23238* (2013.01); *H04N 5/23296* (2013.01); *G06T 7/001* (2013.01); *G06T 7/74* (2017.01)

(56) References Cited

U.S. PATENT DOCUMENTS

| | | | |
|---|---|---|---|
| 6,870,689 B2 | 3/2005 | Yoshida | |
| 6,977,777 B1 | 12/2005 | Wick | |
| 2001/0033338 A1 | 10/2001 | Hunter | |
| 2002/0102102 A1 | 8/2002 | Watanabe et al. | |
| 2003/0107789 A1 | 6/2003 | Hishioka | |
| 2007/0008634 A1 | 1/2007 | Chiu | |
| 2010/0283868 A1* | 11/2010 | Clark | H04N 5/232125 348/222.1 |
| 2011/0181955 A1 | 7/2011 | Cho et al. | |
| 2012/0275031 A1* | 11/2012 | Kong | G02B 3/14 359/666 |
| 2013/0188232 A1 | 7/2013 | Rosen | |
| 2014/0143630 A1 | 5/2014 | Mu et al. | |

FOREIGN PATENT DOCUMENTS

| | | | |
|---|---|---|---|
| JP | 2002-190971 A | 7/2002 |
| JP | 2002-303783 A | 10/2002 |
| JP | 2003-161874 A | 6/2003 |
| JP | 2006-84495 A | 3/2006 |
| JP | 2006-138950 A | 6/2006 |
| JP | 2009-180758 A | 8/2009 |
| JP | 2011-205530 A | 10/2011 |
| JP | 2011-221183 A | 11/2011 |
| JP | 2012-123813 A | 6/2012 |
| JP | 2012-133026 A | 7/2012 |

OTHER PUBLICATIONS

International Search Report and Written Opinion dated Aug. 28, 2015, for corresponding International Application No. PCT/US2015/031541, 16 pages.

Kaylor, B.M., et al., "Miniature non-mechanical zoom camera using deformable MOEMS mirrors," *Proceedings of SPIE 8252*, SPIE MOEMS-MEMS San Francisco, 2012, 8 pages.

Lin et al., "Optical zoom module based on two deformable mirrors for mobile device applications," *Applied Optics 51*(11):1804-1810, 2012.

Lu, Y., et al., "Polymorphic Optical Zoom With MEMS DMs," *Proceedings of SPIE 7931*, 2011, 7 pages.

Lu, Y., et al., "Variable zoom system with aberration correction capability," *Journal of Modern Optics*, 2012, pp. 1-7.

Moghimi, S.M.J., "Large-Stroke Deformable MEMS Mirror for Focus Control," Montana State University, Bozeman, Montana, Nov. 2013, 144 pages.

UP-1830CL B/W Digital CCD Camera, Uniq Vision, Inc., Jul. 2017, 2 pages.

* cited by examiner

HIGH SPEED VARIABLE FOCAL FIELD LENS ASSEMBLY AND RELATED METHODS

BACKGROUND

Technical Field

The present disclosure generally relates to optical devices. More particularly, the present disclosure relates to optical devices that have a variable focal length and methods of operating the same.

Description of the Related Art

The focal length of a lens is a measure of how strongly the lens converges or diverges light. In practical terms, for an optical system in air, the focal length represents the distance over which initially collimated rays are brought to a focus or focal point. In a traditional compound lens, such as those used in conjunction with still or cinematographic image capture devices, individual lens elements are disposed within a barrel-shaped housing. Where the lens elements are at fixed locations within the housing, the lens typically provides a fixed focal length lens (e.g., 50 mm, 135 mm, 500 mm, 800 mm). Where the lens elements are moveable with respect to each other, for example by physically lengthening or shortening the length of the housing, the lens typically provides a variable focal length or "zoom" lens (e.g., 35-80 mm, 50-135 mm, 200-500 mm). As the lens focal length increases, the size and weight of the lens also tends to increase.

Depth of field is the distance between the nearest and farthest objects in a scene that appear acceptably sharp or in focus in an image. With other factors such as exposure settings held constant, depth of field and focal length share an inverse relationship—generally the shorter the focal length, the greater the depth of field and the greater the focal length the shorter the depth of field. In photography and cinematography, depth of field may be used as an artistic element to preferentially focus the viewer's attention on a desired area of an image. For example, an actor's face may be positioned within the depth of field of the lens while out of focus background elements fall outside the depth of field.

BRIEF SUMMARY

Lenses using a combination of lens elements and reflective elements reduce the overall size and weight associated with traditional lenses formed using only lens elements. Such reflective lenses provide a relatively compact, relatively lightweight, small form factor lens often with extremely long focal lengths that can exceed 1000 mm. A typical arrangement in a reflector lens includes an entry lens and a first reflective element that reflects at least a portion of the incoming light on a second reflective element. At least a portion of the light reflected from the second element focuses at a point (i.e., the focal point of the lens) which is generally located on the film plane (for traditional film photography or cinematography) or an image sensor (for digital photography or cinematography).

According to an aspect of the present disclosure, deformable or adaptable lens elements and/or deformable or adaptable reflective elements may be integrated into a lens to provide a lens having a variable focal length. Using deformable or adaptable lens elements and/or deformable or adaptable reflective elements, construction of a single lens having a variable focal length (e.g., less than 6 mm to in excess of 2,000 mm) is possible. Such a lens may be constructed by combining at least a deformable or adaptable entry lens element with a number of deformable or adaptable reflective elements.

According to another aspect of the present disclosure, the optical characteristics and/or physical geometry of a deformable lens elements and deformable reflective elements change when subjected to an externally applied force. Such external forces may be in the form of a mechanical force, an electrical current, an electromechanical force, or an electromagnetic field. In particular, a class of deformable lens elements and deformable reflective elements experience a deformation in response to exposure to electromagnetic energy at a particular frequency or within a particular frequency band. One or more aspects of the physical deformation of the deformable lens elements and/or deformable reflective elements (displacement magnitude, location, duration, etc.) may be controlled or adjusted by controlling or adjusting the parameters of the electromagnetic energy to which the respective element is exposed. The response of such deformable lens elements and/or deformable reflective elements may be hundreds or even thousands of hertz (e.g. 100 Hz to 10,000 Hz). The incorporation of such deformable lens elements and deformable reflective elements into a reflector lens results in a lens having a variable focal length based on the parameters of the electromagnetic energy used to stimulate the deformable lens elements and/or deformable reflective elements. Advantageously, the focal length of a reflector lens incorporating such deformable elements is alterable or changeable at a rate approaching the rate at which the reflective elements are deformed (i.e., hundreds or even thousands of times per second).

According to another aspect of the present disclosure, when a variable focal length optical assembly is coupled to an image acquisition device capable of capturing thousands of images or frames per second, a system capable of generating for each playback frame of a motion picture a number of images or sub-frames, each at known, different, focal length, is created. As one example, the availability of a number of images/sub-frames for each playback frame of a 24 to 48 frame per second motion picture advantageously provides editors and directors with the advantageous ability to shoot a scene one time with a single high-speed camera and thereafter select particular images or sub-frames with the greatest artistic merit. As another example, the availability of a number of images/sub-frames for each playback frame of a 1 to 30 frame per second surveillance video advantageously provides system operators and law enforcement with the advantageous ability to select an image having a focal length that provides a clear image of a suspect, a vehicle, or a license plate.

To provide one example, comparing the playback or first frame rate (e.g., 48 fps) of a motion picture to the response time of a reflective lens equipped with deformable reflective elements (e.g., 1000 Hertz) it is possible to sequentially capture images at up to 20 different focal lengths at the 48 fps first frame rate. Such results in the capture of twenty images or sub-frames, each at a different focal length, for each respective one of the playback frames. Such flexibility is comparable to having twenty different fixed-focal length conventional (i.e., film) cinematic cameras simultaneously capturing a scene at 48 frames per second. The artistic flexibility presented by the availability of such a wide variety of images/sub-frames during the post-production provides a tremendous benefit. Such flexibility permits a film crew to shoot a scene with a single, high-speed, camera capable of contemporaneously capturing twenty or more 48 fps motion pictures, each at a different focal length rather than requiring either multiple takes or shooting with twenty different cameras, each having a different focal length lens. Thus, instead of shooting a scene a number of times with different, fixed-focal length lenses or shooting a scene with multiple cameras each having a different, fixed, focal length lens, it is possible to advantageously capture the scene in a single take, using a single, high-speed, camera equipped with a variable focal length optical assembly to provide a wide range of image focal lengths from which to choose.

Since depth of field is inversely related to the focal length of a lens, the ability to alter focal length provides the ability to bring object appearing in a scene into focus (i.e., bring objects into the depth of field) or take objects appearing in a scene out of focus (i.e., remove objects from the depth of field). Such capability is particularly useful, for example in surveillance applications where the availability of an image acquired at multiple depths of field may permit the clear identification of an individual or license number appearing in a scene.

In addition to providing the option of selecting the most desirable fixed-focal length sub-frame image, other effects are possible. For example, a zoom-in or zoom-out effect may be achieved by selecting images/sub-frames having different focal lengths for sequential playback frames or at sequential playback frame intervals. Thus, selecting different images/ sub-frames acquired at gradually decreasing focal lengths (e.g., 500 mm to 50 mm using 10 mm changes in focal length) for sequential playback frames or at sequential playback frame intervals can create a "zoom-out" effect. Conversely, selecting different images/sub-frames acquired at gradually increasing focal lengths (e.g., 50 mm to 500 mm using 10 mm changes in focal length) for sequential playback frames or at sequential playback frame intervals can create a "zoom-in" effect.

For cinematographic devices having a built-in viewfinder, the device operator may be provided with a selectable viewfinder that provides an image corresponding to a particular image focal length/sub-frame/time slot. In some instances such selectable viewfinders may be remotely controlled, for example using a radio frequency or infrared remote control device.

According to other aspects of the present disclosure, a variable focal length optical assembly provides benefits or operations that extend beyond or leverage rapid and dynamic change of focal length. As one example, the variable focal length optical assembly can advantageously assist in performing a high speed auto focus routine. As another example, the variable focal length optical assembly can provide case-specific reduction in distortions introduced by other components of an optical system (e.g., barrel distortion introduced by a parent lens assembly).

Thus, a variable focal length optical assembly can shape incoming light according to various different focal lengths. Further, even in applications where rapid switching of focal lengths is not required, the variable focal length optical assembly provides the ability to easily and reliably control the focal length of captured imagery without losses in image quality.

A variable focal length optical assembly may be summarized as including: a housing having a first end and a second open end; a first deformable reflective element mounted to the housing; at least a second deformable reflective element mounted to the housing, an optical path extending between the first and the second ends of the housing via the first and the second deformable reflective elements; and a set of actuators operable to selectively electromagnetically deform the first deformable reflective element and the second deformable reflective element to selectively vary a focal length of the variable focal optical assembly.

The set of actuators may include: at least a first actuator operable to selectively electromagnetically deform the first deformable reflective element; and at least a second actuator operable to selectively electromagnetically deform the second electromagnetically deformable reflective element. The optical path may include: the first end of the housing via which light enters from an exterior of the housing; the first deformable reflective element from which light reflects toward the second deformable reflective element; the second deformable reflective element from which light reflects; and the second end of the housing from which the reflected light is focused at a defined focal plane. The first and the second deformable reflective elements may be each deformable at a rate of at least 500 Hz. The variable focal length optical assembly may be optically coupled to capture images at a first number of frames per second, and at least one of the first or the second deformable reflective elements may be deformable at a rate that is higher than the first number of frames per second. The variable focal length optical assembly may be optically coupled to capture frames of images at a first rate, and the first and the second deformable reflective elements may be deformable at a second rate that is at least twice the first rate. The housing may be a barrel-shaped housing, the first deformable reflective element may include a concave deformable reflective element that has an aperture disposed therethrough, and the second deformable reflective element may include a convex deformable reflective element. The barrel-shaped housing may have a longitudinal axis, the aperture of the concave deformable reflective element may be coaxially aligned with the longitudinal axis of the barrel-shaped housing, and the convex deformable reflective element may be coaxially aligned with the aperture of the concave deformable element.

The variable focal length optical assembly may further include a deformable entry lens mounted to the housing at the first end of the housing, at least one of the set of actuators operable to selectively electromagnetically deform the deformable entry lens to selectively vary the focal length of the variable focal optical assembly.

The first deformable reflective element may reflect light that entered the first end of the housing at a 225 degree angle towards the second deformable reflective element and the second deformable reflective element may reflect light reflected from the first deformable reflective element at a 225 degree angle towards the second end of the housing. The first deformable reflective element may reflect light that entered the first end of the housing at a 90 degree angle towards the second deformable reflective element and the second deformable reflective element may reflect light reflected from the first deformable reflective element at a 90 degree angle towards the second end of the housing.

The variable focal length optical assembly may further include: a first fold reflective element mounted to the housing; and a second fold reflective element mounted to the housing; wherein the optical path extends from the first deformable reflective element to the first fold reflective element, from the first fold reflective element to the second fold reflective element, and from the second fold reflective element to the second deformable reflective element.

The first deformable reflective element may reflect light that has entered the first end of the housing from an exterior of the housing at a 225 degree angle towards the first fold reflective element, the first fold reflective element may reflect light reflected by the first deformable element at a 225 degree angle towards the second fold reflective mirror, the second fold reflective element may reflect light reflected by the first fold reflective element at a 225 degree angle towards the second deformable reflective element, and the second deformable reflective element may reflect light reflected from the second fold reflective element at a 225 degree angle towards the second end of the housing. The first deformable reflective element may reflect light that has entered the first end of the housing from an exterior of the housing at a 90 degree angle towards the first fold reflective element, the first fold reflective element may reflect light reflected by the first deformable element at a 90 degree angle towards the second fold reflective mirror, the second fold reflective element may reflect light reflected by the first fold reflective element at a 90 degree angle towards the second deformable reflective element, and the second deformable reflective element may reflect light reflected from the second fold reflective element at a 90 degree angle towards the second end of the housing.

The variable focal length optical assembly may further include: a first optical isolator that has a first selectively reflective element; and a second optical isolator that has a second selectively reflective element; wherein the optical path extends from the first deformable reflective element to the first isolator, from the first isolator to the second deformable reflective element, and from the second deformable reflective element to the second isolator.

The first deformable reflective element may reflect light that has entered the first end of the housing from an exterior of the housing and passed through the first selectively reflective element at a 180 degree angle towards the first selectively reflective element, the first selectively reflective element may reflect light that has been reflected by the first deformable reflective element at a 90 degree angle towards the second selectively reflective element and towards the second deformable reflective element, the second deformable reflective element may reflect light that has been reflected by the first selectively reflective element and passed through the second selectively reflective element at a 180 degree angle towards the second selectively reflective element, and the second selectively reflective element may reflect light that has been reflected by the second deformable element at a 90 degree angle towards the second end of the housing.

The variable focal length optical assembly may further include: a first optical isolator that has a first selectively reflective element; a second optical isolator that has a second selectively reflective element; a first fold reflective element mounted to the housing; and a second fold reflective element mounted to the housing, wherein the optical path extends from the first deformable reflective element to the first selectively reflective element, from the first selectively reflective element to the first fold reflective element, from the first fold reflective element to the second fold reflective element, from the second fold reflective element through the second selectively reflective element to the second deformable reflective element, and from the second deformable reflective element to the second selectively reflective element.

The first deformable reflective element may reflect light that has entered the first end of the housing from an exterior of the housing and passed through the first selectively reflective element at a 180 degree angle towards the first selectively reflective element, the first selectively reflective element may reflect light that has been reflected by the first deformable reflective element at a 90 degree angle towards the first fold reflective element, the first fold reflective element may reflect light that has been reflected by the first selectively reflective element at a 90 degree angle towards the second fold reflective element, the second fold reflective element may reflect light that has been reflected by the first fold reflective element at a 90 degree angle towards the second selectively reflective element and towards the second deformable reflective element, the second deformable reflective element may reflect light that has been reflected by the second fold reflective element and passed through the second selectively reflective element at a 180 degree angle towards the second selectively reflective element, and the second selectively reflective element may reflect light that has been reflected by the second deformable element at a 90 degree angle towards the second end of the housing. One or both of the first deformable reflective element and the second deformable reflective element may be selectively deformable into both of a convex deformed configuration and a concave deformed configuration.

The variable focal length optical assembly may further include: at least one controller communicatively coupled to the first and the second actuators; and a controller-readable nontransitory storage media communicatively coupled to the at least one controller that includes at least one instruction set that when executed by the at least one controller may cause the at least one controller to: electromagnetically deform at least one of the first or the second deformable reflective elements such that for each of a plurality of sequential frames, the at least one image sensor captures a plurality of sub-frames, each of the sub-frames including an image of a scene external to the system acquired at one of a plurality of defined focal lengths.

A method of capturing images with a variable focal length optical assembly may be summarized as including: for a first frame rate, capturing images at each of a plurality of focal lengths of the variable focal length optical assembly, the capturing of the images at a higher rate than the first frame rate; and storing the captured images to nontransitory processor-readable media.

A method of using images captured images with a variable focal length optical assembly may be summarized as including: receiving an indication of a first focal length; for a first frame rate and the first focal length, retrieving from a nontransitory processor-readable medium a first plurality of images, the images of the first plurality stored at a first defined offset from one another.

The method of using images captured images with a variable focal length optical assembly may further include: receiving an indication of a second focal length; for the first frame rate and the second focal length, retrieving from the nontransitory processor-readable medium a second plurality of images, the images of the second plurality stored at a second defined offset from one another.

The method of using images captured images with a variable focal length optical assembly may further include: receiving an indication of a change in focal length between the first focal length and a second focal length; for the first frame rate and the second focal length, retrieving from the nontransitory processor-readable medium a further plurality of images, the images of the further plurality stored at an increasing or decreasing offset from one another.

An optical system may be summarized as including: a parent lens assembly; a variable focal length optical assembly comprising at least one deformable element and at least one actuator operable to selectively electromagnetically deform the at least one deformable element to selectively vary a focal length of the variable focal optical assembly; and an image acquisition device, an optical path extending from an exterior of the optical system to the image acquisition device via the parent lens assembly and the variable focal length optical assembly.

The optical system may include an afocal optical system in which the parent lens assembly is mounted to the image acquisition device and the variable focal length optical assembly is removably mounted to the parent lens assembly.

The optical system may further include: at least one controller; and a controller-readable nontransitory storage media communicatively coupled to the at least one controller that includes at least one instruction set that when executed by the at least one controller causes the at least one controller to respectively generate focal length metadata for each of a plurality of images captured by the optical system based at least in part on first focal length value of the parent lens assembly and a plurality of second focal length values that respectively describe a plurality of different focal lengths of the variable focal length optical assembly at respective times at which the plurality of images were respectively captured.

The at least one instruction set when executed by the at least one controller may further cause the at least one controller to provide a first image of the plurality of images for display to an operator, the first image which has focal length metadata that describes a focal length requested by the operator. The optical path may include: a first end of variable focal length optical assembly via which light enters the variable focal length optical assembly from an exterior of the optical system; the first deformable reflective element; a second end of the variable focal length optical assembly from which light reflected by the first deformable reflective element exits the variable focal length optical assembly; a first end of the parent lens assembly via which light that has exited the variable focal length optical assembly enters the parent lens assembly; and a second end of the parent lens assembly at which light exits the parent lens assembly.

The optical system may further include: at least one controller; and a controller-readable nontransitory storage media communicatively coupled to the at least one controller that includes at least one instruction set that when executed by the at least one controller causes the at least one controller to respectively modify a first focal length value of the parent lens assembly based at least in part on a plurality of different focal lengths of the variable focal length optical assembly at respective times at which a plurality of images were respectively captured to generate focal length metadata for each of the plurality of images captured by the optical system.

The parent lens assembly and the image acquisition device may include components of an endoscope. The optical path may include: a first end of the parent lens assembly via which light enters the parent lens assembly from an exterior of the optical system; a second end of the parent lens assembly via which light exits the parent lens assembly; a first end of variable focal length optical assembly via which light that has exited the parent lens assembly enters the variable focal length optical assembly; the first deformable reflective element; and a second end of the housing at which light reflected by the first deformable reflective element exits the variable focal length optical assembly.

The optical system may further include: at least one controller; and a controller-readable nontransitory storage media communicatively coupled to the at least one controller that includes at least one instruction set that when executed by the at least one controller causes the at least one controller to respectively modify a plurality of different focal length values that respectively describe a plurality of different focal lengths of the variable focal length optical assembly respective times at which a plurality of images were respectively captured to generate focal length metadata for each of the plurality of images captured by the optical system, the plurality of different focal length values respectively modified based at least in part on a first focal length value that describes a focal length of the parent lens assembly.

The variable focal length optical assembly may eliminate a barrel distortion introduced by the parent lens assembly.

A method may be summarized as including: providing for display a first image channel of a plurality of image channels that respectively depict a scene at a plurality of different focal lengths, the plurality of image channels having a frame rate, each image channel comprising a plurality of sequential image frames that have the respective focal length of the respective image channel, the plurality of image channels concurrently captured by an optical system that includes a single image acquisition device in optical communication with a variable focal length optical assembly comprising at least one deformable optical element, the variable focal length optical assembly operable to capture images at each of the plurality of different focal lengths within a single frame of the frame rate; receiving data that describes a viewer input that requests a change in focal length; and responsive to the viewer input, providing a second image channel of the plurality of image channels for display.

Receiving data that describes a viewer input may include receiving data that describes the viewer input that requests a particular focal length, and providing the second image channel comprises, responsive to the viewer input, providing the second image channel for display, the second image channel comprising sequential image frames at the particular focal length.

The method may further include capturing, by the optical system, the images at each of the plurality of focal lengths to generate the plurality of image channels, the capturing of the images at a higher rate than the frame rate.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles may not be drawn to scale, and some of these elements may be arbitrarily enlarged and positioned to improve drawing legibility. Further, the particular shapes of the elements as drawn are not necessarily intended to convey any information regarding the actual shape of the particular elements, and may have been selected solely for ease of recognition in the drawings.

DETAILED DESCRIPTION

In the following description, certain specific details are set forth in order to provide a thorough understanding of various disclosed embodiments. However, one skilled in the relevant art(s) will recognize that embodiments may be practiced without one or more of these specific details, or with other methods, components, materials, etc. In other instances, well-known structures associated with lenses and image acquisition systems including mechanical and electronic shutters, mechanical and electronic aperture devices, image sensors, image data acquisition and storage, and data transfer networks and devices have not been shown or described in detail to avoid unnecessarily obscuring descriptions of the embodiments. Details regarding conventional lens elements including the physical configuration and/or geometry of such elements and the materials used in forming such elements have not been shown or described in detail to avoid unnecessarily obscuring descriptions of the embodiments. Details regarding conventional reflective elements referred to herein may have any physical configuration and/or geometry, may be formed from any suitable material including metal, metal alloys, glass, polymers, or combinations thereof, may include a coating and/or surface treatment providing suitable reflective properties, and may include dichroic mirrors.

Unless the context requires otherwise, throughout the specification and claims which follow, the word "comprise" and variations thereof, such as "comprises" and "comprising," are synonymous with "includes" or "including," and are inclusive or open-ended (i.e., do not exclude additional, unrecited elements or method acts). Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1A:
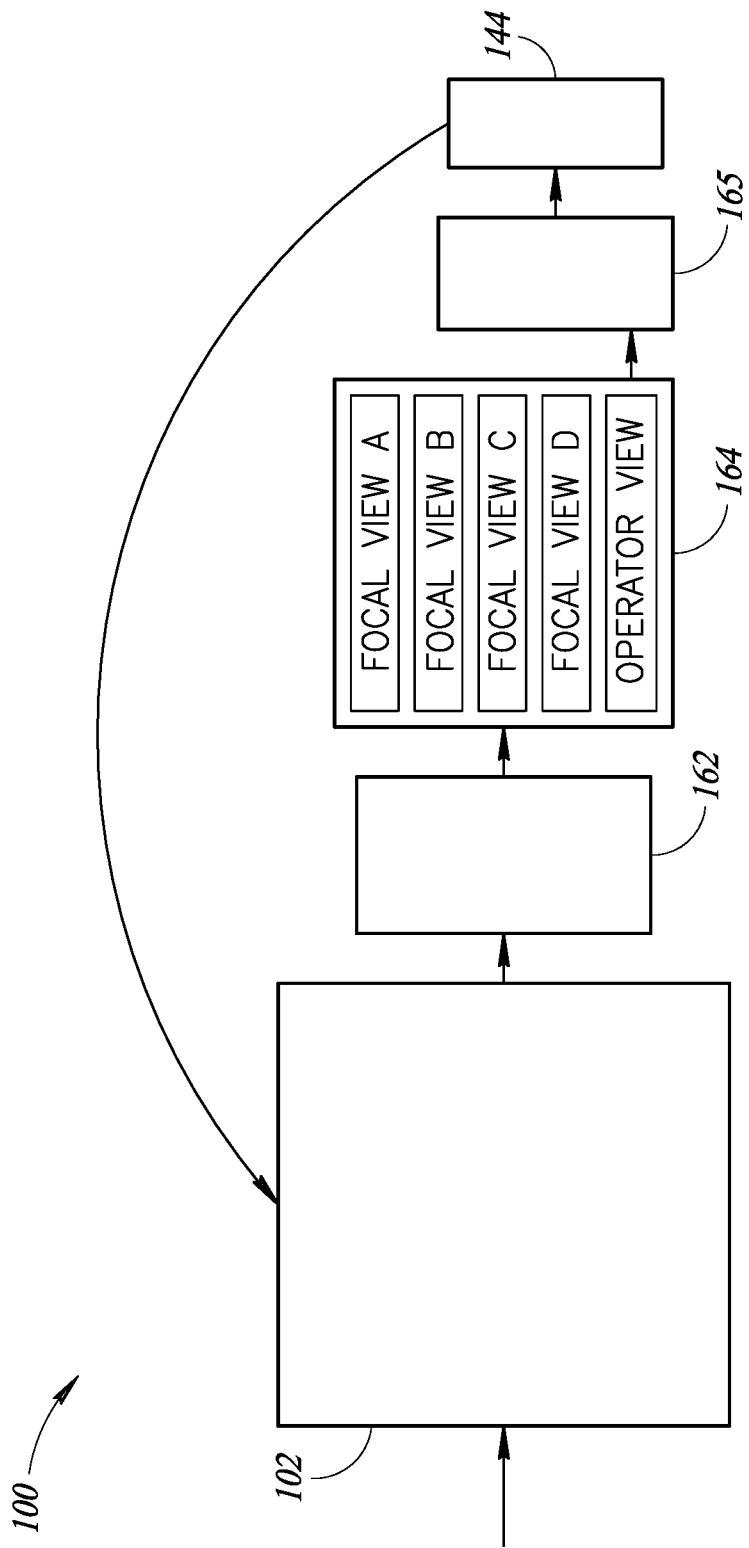
FIG. 1A is a block diagram of an example optical system that includes a variable focal length optical assembly, according to at least one illustrated embodiment.

FIG. 1A is a block diagram of an example optical system 100 that includes a variable focal length optical assembly 102, according to at least one illustrated embodiment. In particular, the system 100 includes the variable focal length optical assembly 102 that is optically and operatively coupled with an image capture device 162. The system 100 operates to capture a plurality of images that respectively have a plurality of different focal lengths. The plurality of images are represented collectively at block 164 of FIG. 1.

More particularly, according to an aspect of the present disclosure, the variable focal length optical assembly 102 can include one or more dynamically deformable optical elements that permit the variable focal length optical assembly 102 to rapidly and dynamically adjust a focal length provided by the assembly 102. Example structures and designs for the variable focal length optical assembly 102 will be discussed further below, including with reference to FIGS. 1B and 4-10.

Light enters the variable focal length optical assembly 102 from an exterior of the system 100; is shaped and/or reflected by the one or more dynamically deformable optical elements of the variable focal length optical assembly 102; and then exits the variable focal length optical assembly 102.

Light that has exited the variable focal length optical assembly 102 then impinges upon the image capture device 162. The image capture device 162 transforms the received light into image data representative of the plurality of images 164. Example image capture devices 162 include, but are not limited to: complementary-metal oxide semiconductor (CMOS) sensor(s) and charge coupled device (CCD) sensor(s). In some implementations, the image capture device 162 may be a component of an image acquisition device, such as a camera, as will be discussed further with reference to FIG. 1B.

FIG. 1 includes a block 164 that represents the plurality of images captured by the image capture device 162. For example, a non-transitory memory associated with the image capture device 162 can store the plurality of images 164 as they are captured by the device 162. For example, the non-transitory memory may be a component of the same image acquisition device as the image capture device 162. Alternatively or in addition to storage by a memory, the image capture device 162 can output or otherwise stream the plurality of images 164.

The system 100 can optionally further include a display 165. For example, the display 165 can be a display of an image acquisition device such as a camera or can be a display associated with a computing system that operates and/or controls the optical components of the system 100.

At least one of the plurality of images 164 can be displayed on the display 165 for viewing by an operator of the system 100. The particular image provided to display 165 can be selected by the operator. For example, the operator can select an image having a particularly desired focal length or the operator can navigate between captured images of different focal lengths until an image of desired focal length is provided to display 165. Thus, while the system 100 rapidly and dynamically captures a plurality of images at different focal lengths, a single image or stream of images may be selected for presentation on display 165.

In some implementations, the system 100 continuously or periodically generates and outputs the plurality of images 164 in the form of a plurality of image channels that respectively depict a scene at the plurality of different focal lengths. For example, the plurality of image channels may have a frame rate (e.g., 48 fps) and each image channel may include one image at the particular focal length for such channel per frame.

Thus, to provide one example, as illustrated at block 164, the system 100 can output five image channels respectively having five different focal lengths, where each of the five image channels includes one image per frame at a frame rate of 48 fps. Although five image channels are shown and discussed, such number is an example only. Any number of image channels can be captured and/or streamed, subject only to operative limitations associated with deformation rate of the variable focal length optical assembly 102 and/or the capture rate of the image capture device 162.

System 100 may optionally further include a focal length controller 144. In some implementations, the focal length controller 144 is operable to adjust the range of focal lengths at which the system 100 captures the plurality of images 164. Alternatively or additionally, the focal length controller 144 may be operable to adjust the particular focal length of imagery that is provided to display 165 for presentation to the operator (e.g., the "operator view"). In some implementations, the focal length controller 144 may be denominated as a zoom controller as it allows either or both of the focal lengths captured or provided to the display 165 to be "zoomed in" and "zoomed out" by adjusting the focal length of the imagery.

One or both of the variable focal length optical assembly 102 and the image capture device 162 may be operatively and communicatively coupled to a controller or other processor-based device, as will be discussed further below with reference to FIG. 1B.

Figure 1B:
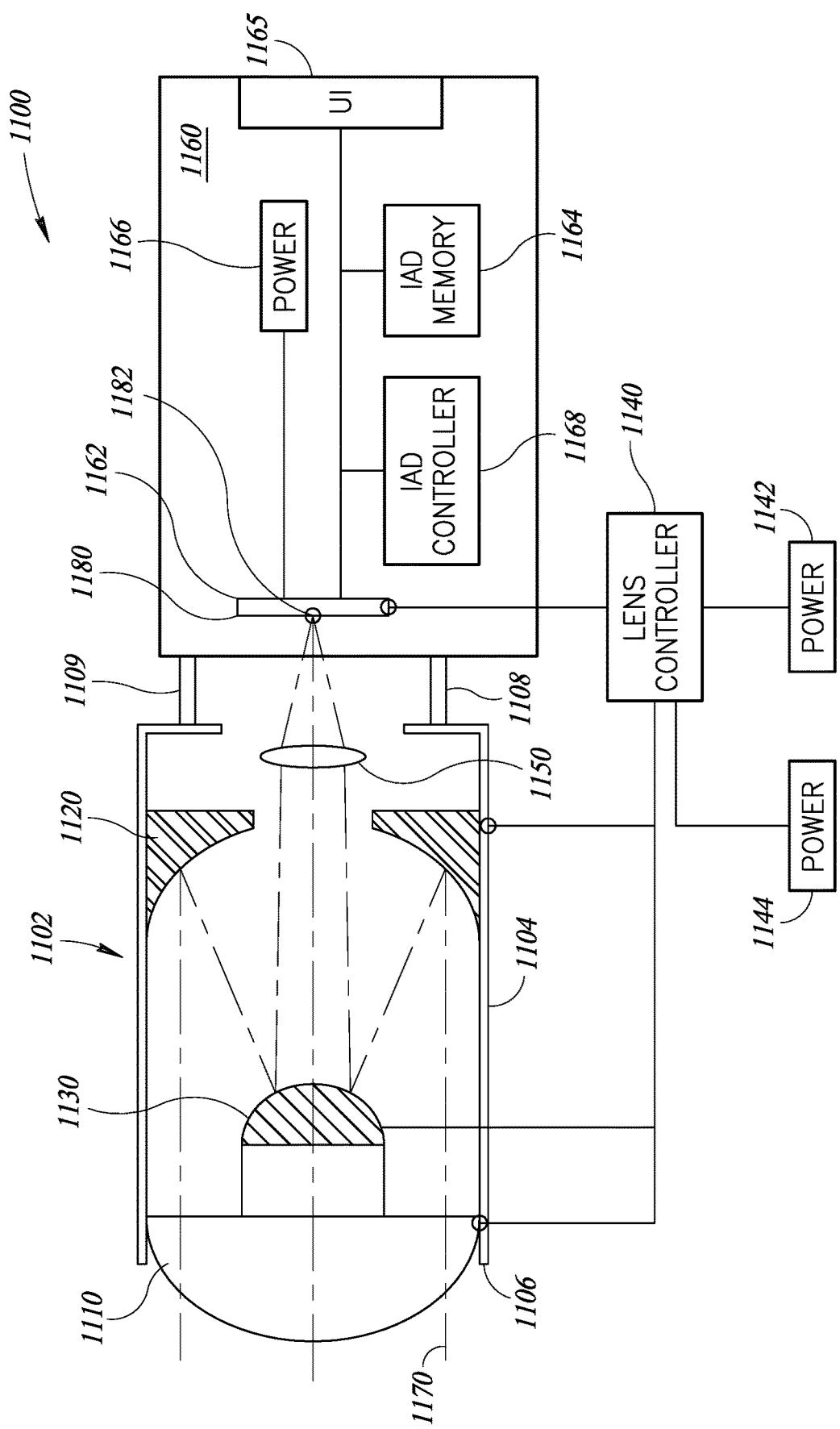
FIG. 1B is a schematic diagram showing an example variable focal length optical assembly that includes a deformable entry lens element and a deformable reflective element in cross-section, according to at least one illustrated embodiment.

FIG. 1B shows an example variable focal length optical assembly system 1100 that includes a variable focal length optical assembly 1102 coupled to an optional image acquisition device 1160, according to at least one embodiment. The variable focal length optical assembly 1100 includes a housing 1104 having a first end 1106 and second end 1108, a deformable entry lens element 1110, a first deformable reflective element 1120, a second deformable reflective element 1130, and a system controller 1140, according to one illustrated embodiment. The variable focal length optical assembly 1102 may be operably and communicatively coupled to the image acquisition device 1160 via one or more couplings 1109 such as a threaded or bayonet type lens mount. The controller 1140 may be communicatively coupled to and control one or more aspects of an image capture device 1162 positioned at the focal plane 1180 of the lens 1102. By coordinating the operation the deformable entry lens element 1110, the deformable first and second reflective elements 1120 and 1130, and the image capture device 1160, the controller 1140 is able to collect data indicative of properly focused and correctly exposed images at a plurality of focal lengths using, for example the image capture device 1162.

The deformable entry lens element 1110, the first deformable reflective element 1120, and the second deformable reflective element 1130 are individually controllable by the controller 1140. The individual control of each of the deformable elements 1110, 1120, and 1130 permits the variable focal length optical assembly 1102 to provide any number of focal lengths. In at least one implementation, the controller 1140 can alter, adjust, or control the deformation of the deformable elements 1110, 1120, and 1130 such that the variable focal length optical assembly 1102 can be adjusted to provide any focal length from fish-eye focal lengths (e.g., less than 6 millimeters (6 mm)) to extreme telephoto focal lengths (e.g., greater than 2,000 mm).

The deformable entry lens element 1110, the first deformable reflective element 1120, and the second deformable reflective element 1130 are individually, selectively, controllably, deformed by subjecting the respective element to one or more externally applied forces. Such externally applied forces may include the application of mechanical forces, electrical current, electromechanical forces, or electromagnetic energy to the deformable elements 1110, 1120, and 1130. In some implementations, electromagnetic energy having one or more defined parameters such as frequency, phase, and/or waveform may be used to cause the deformation of the deformable elements 1110, 1120, and 1130.

As an example, the controller 1140 can control respective actuators respectively associated with the deformable elements 1110, 1120, and 1130 to respectively control the deformation of the deformable elements 1110, 1120, and 1130. The actuators can respectively provide the mechanical force, the electrical current, the electromechanical force, the electromagnetic field, or other force to respectively deform the deformable elements 1110, 1120, and 1130.

In some instances, the deformable entry lens element 1110, the first deformable reflective element 1120, and the second deformable reflective element 1130 may be deformed hundreds or even thousands of times per second (i.e., at a frequency of hundreds or thousands of hertz) via the selective and controlled application of electromagnetic energy. Thus, by deforming at least one of the deformable elements 1110, 1120, and/or 1130, the controller 1140 is able to provide hundreds or even thousands of changes in lens focal length per second.

Playback frame rates vary widely dependent on application. For example, a first frame rate may correspond to a cinematographic playback frame rates, such as those used in motion pictures, of from about 20 or 24 frames per second ("fps") to about 48 or 50 fps. In another example, a first frame rate may correspond to a surveillance video playback frame rate of from about 1 fps to about 30 fps. Since the deformable elements 1110, 1120, and 1130 are able to provide hundreds or even thousands of lens focal length changes per second, at typically encountered first frame rates of 1 to 50 frames per second it is possible to capture images or sub-frames of a scene at multiple focal lengths for each playback frame. The example fps rates provided for cinematographic and surveillance applications are provided as examples only. Other frame rates can easily be accommodated.

For example, a variable focal length optical assembly 1102 may have the capability to change focal length 150 times per second (i.e., a focal length shift frequency of 150 Hertz). At a first frame rate (i.e., a playback frame rate) of 50 frames per second, three different images or sub-frames (hereinafter, "images/sub-frames" to indicate the 1:1 relationship between a captured image and a sub-frame), each acquired at a different lens focal length, may be captured or acquired by the image capture device 1162 for each playback frame. Thus, for each playback frame "X," a first image/sub-frame "$X_1$" captured at a lens focal length of 50 mm, a second image/sub-frame "$X_2$" captured at a lens focal length of 200 mm, and a third image/sub-frame "$X_3$" captured at a lens focal length of 500 mm may be acquired. At higher lens frequencies, larger numbers of image/sub-frames $X_n$ may be acquired for each playback frame while still maintaining the defined first frame rate.

The deformable entry lens element 1110, the first deformable reflective element 1120, and the second deformable reflective element 1130 are disposed within a housing 1104 having a first end 1106 through which at least a portion of the light reflected from an external scene enters. The housing 1104 also has a second end 1108 through which at least a portion of the light entering the first end 1106 of the housing 1104 exits. In some implementations, the variable focal length optical assembly 1102 may include one or more conventional (i.e., non-deformable) lenses or lens elements 1150 positioned along the optical path 1170 through the variable focal length optical assembly 1102. At least a portion of the light exiting the housing 1104 can enter the optional coupled image acquisition device 1160 and fall incident upon one or more image capture devices 1162 positioned on the focal plane 1180 of the variable focal length optical assembly 1102. For example, the light may be focused at a focal point 1182 on the focal plane 1180.

The deformable entry lens element 1110 can include any type of current or future developed optically transparent or translucent lens element having a variable and/or adjustable physical configuration or geometry. The deformable entry lens element 1110 may include one or more lens elements. The deformable entry lens element 1110 may include one or more biconvex, plano-convex, meniscus convex, biconcave, plano-concave, or meniscus concave lens elements. The deformable entry lens element 1110 can deform in response to exposure to forces such as mechanical forces (e.g., mechanical actuation), electrical current (e.g., electrical actuation), and/or electromagnetic energy (e.g., electromagnetic actuation).

In some implementations, the deformable entry lens element 1110 can include an optically transparent or translucent lens element having a physical configuration or geometry adjustable or deformable when exposed to an externally applied source of mechanical, electrical, electromechanical, electromagnetic energy, or other forces. At times, upon being subject to an externally supplied energy source, one or more physical properties of the deformable entry lens element 1110 (e.g., lens diameter) may increase or decrease upon exposure to electromagnetic energy. In such instances, the housing 1104 may include a flexible or pliable segment to accommodate changes to the physical size of the deformable entry lens element 1110. In such implementations, the controller 1140 may generate all or a portion of the force and/or energy (e.g., electromagnetic energy) used to deform the deformable entry lens element 1110. In some implementations, the controller 1140 may generate a control signal or control output supplied to one or more final control elements that control one or more parameters and/or supply of all or a portion of the force and/or energy (e.g., electromagnetic energy) used to deform the deformable entry lens element 1110. In some implementations, the deformable entry lens element 1110 can be selectively deformed to selectively result in the convergence, divergence, focusing at infinity, or collimation of light that passes through the deformable entry lens element 1110.

The first deformable reflective element 1120 can include any type of current or future developed reflective element having a variable and/or adjustable physical configuration or geometry. The first deformable reflective element 1120 may include one or more reflective elements. The first deformable reflective element 1120 may include one or more planar, convex, concave, spherical concave, spherical convex, or parabolic reflective elements. The first deformable reflective element 1120 can deform responsive to exposure to forces such as mechanical forces (e.g., mechanical actuation), an electrical current (e.g., electrical actuation), and/or electromagnetic energy (e.g., electromagnetic actuation).

In some implementations, the first deformable reflective element 1120 can include any number of reflective elements some or all of which have a physical configuration or geometry adjustable or deformable when exposed to an externally applied source of mechanical, electrical, electromechanical, electromagnetic energy, or other forces. At times, upon being subject to an externally supplied energy source, one or more physical properties of the first deformable reflective element 1120 (e.g., reflector diameter) may increase or decrease upon exposure to such electromagnetic energy. In such instances, the housing 1104 may include a flexible or pliable segment to accommodate changes to the physical size of the first deformable reflective element 1120. In such implementations, the controller 1140 may generate all or a portion of the force and/or energy (e.g., electromagnetic energy) used to deform the first deformable reflective element 1120. In some implementations, the controller 1140 may generate a control signal or control output supplied to one or more final control elements that control one or more parameters and/or supply of all or a portion of the force and/or energy (e.g., electromagnetic energy) used to deform the first deformable reflective element 1120. In at least one implementation, the first deformable reflective element 1120 may include a concave reflective element having an aperture disposed therethrough to permit the passage of the optical path 1170 through the first deformable reflective element 1120 to the image capture device 1160.

In other implementations, the first deformable reflective element 1120 can be selectively deformable into both of a convex deformed configuration and a concave deformed configuration. In particular, the first deformable reflective element 1120 can be deformed into a concave configuration to adjust the focal length provided by the assembly 1102 in a first direction or deformed into a convex configuration to adjust the focal length provided by the assembly 1102 in a second direction that is opposite the first. Thus, for example, a base or non-deformed configuration of the first deformable reflective element 1120 can correspond to a focal length that is approximately a median of a range of focal lengths associated with a range of deformation of the first deformable reflective element 1120. In some implementations, the base or non-deformed configuration provides a planar (i.e., neither convex nor concave) surface to reflect light. In some implementations, the first deformable reflective element 1120 can be selectively deformed to selectively result in the convergence, divergence, focusing at infinity, or collimation of light that reflects from the first deformable reflective element 1120.

The second deformable reflective element 1130 can include any type of current or future developed reflective element having a variable and/or adjustable physical configuration or geometry. The second deformable reflective element 1130 may include one or more reflective elements. The second deformable reflective element 1130 may include one or more planar, convex, concave, spherical concave, spherical convex, or parabolic reflective elements. The second deformable reflective element 1130 can deform responsive to exposure to forces such as mechanical forces (e.g., mechanical actuation), an electrical current (e.g., electrical actuation), and/or electromagnetic energy (e.g., electromagnetic actuation).

In some implementations, the second deformable reflective element 1130 can include any number of reflective elements some or all of which have a physical configuration or geometry adjustable or deformable when exposed to an externally applied source of mechanical, electrical, electromechanical, or electromagnetic energy or force. At times, upon being subject to an externally supplied energy source, one or more physical properties of the second deformable reflective element 1130 (e.g., reflector diameter) may increase or decrease upon exposure to such electromagnetic energy. In such instances, the housing 1104 may include a flexible or pliable segment to accommodate changes to the physical size of the second deformable reflective element 1130. In such implementations, the controller 1140 may generate all or a portion of the force and/or energy (e.g., electromagnetic energy) used to deform the second deformable reflective element 1130. In some implementations, the controller 1140 may generate a control signal or control output supplied to one or more final control elements that control one or more parameters and/or supply of all or a portion of the force and/or energy (e.g., electromagnetic energy) used to deform the second deformable reflective element 1130. In at least one implementation, the second deformable reflective element 1130 may include a convex reflective element positioned within the housing 1102 at a location along the optical path 1170 to reflect at least a portion of the incident light out the second end 1106 1108 of the housing 1102 and toward the one or more image capture devices 1160.

In other implementations, the second deformable reflective element 1130 can be selectively deformable into both of a convex deformed configuration and a concave deformed configuration. In particular, the second deformable reflective element 1130 can be deformed into a concave configuration to adjust the focal length provided by the assembly 1102 in a first direction or deformed into a convex configuration to adjust the focal length provided by the assembly 1102 in a second direction that is opposite the first. Thus, for example, a base or non-deformed configuration of the second deformable reflective element 1130 can correspond to a focal length that is approximately a median of a range of focal lengths associated with a range of deformation of the second deformable reflective element 1130. In some implementations, the base or non-deformed configuration provides a planar (i.e., neither convex nor concave) surface to reflect light. In some implementations, the second deformable reflective element 1130 can be selectively deformed to selectively result in the convergence, divergence, focusing at infinity, or collimation of light that reflects from the second deformable reflective element 1130.

The controller 1140 may include any processing device capable of accepting one or more user inputs and providing a number of outputs useful for controlling at least the deformation of the lens elements 1110 and/or reflective elements 1120, 1130 in the variable focal length optical assembly 1100. In some instances, the controller 1140 may be disposed in or proximate the variable focal length optical assembly 1100. In some instances, all or a portion of the controller 1140 or all or a portion of the controller 1140 functionality may be provided by an image acquisition device controller 1168 that is disposed in or proximate the image acquisition device 1160. At times, at least a portion of the power used by the controller 1140 to deform the lens elements 1110, 1120, and 1130 may be provided by an external power source 1142 such as an energy storage device (e.g., battery, ultracapacitor, or similar) or from an external power grid. At other times, at least a portion of the power used by the controller 1140 to deform the lens elements 1110, 1120, and 1130 may be provided by the image acquisition device power source 1166 for the image acquisition device 1160 to which the variable focal length optical assembly 1102 is attached.

Although not shown in FIG. 1B, the variable focal length optical assembly 1102 may optionally include one or more exposure control devices. For example, the variable focal length optical assembly 1102 may optionally include an aperture to limit the amount of light falling incident upon the focal plane 1180 of the image acquisition device 1160. Such an aperture may include a mechanical aperture, such as a metal leaf aperture, or an electronic aperture such as a liquid crystal (LCD) aperture.

In some implementations, the variable focal length optical assembly 1102 and/or the image acquisition device 1160 can include or have mounted thereto a dynamic variable aperture (not shown). The dynamic variable aperture can include an electroactive polymer for shaping the aperture or otherwise shaping or selectively admitting light through the aperture.

As one example, the dynamic variable aperture can include an opaque electroactive polymer with a center portion removed or otherwise not present (e.g., an annular shaped polymer). The center portion may correspond to a smallest operably available aperture size. The opaque electroactive polymer can be disposed between two transparent plates and connected to a power source (e.g., source 1142). Adjusting the voltage or other characteristics of the power applied to the polymer can result in the aperture "opening" or otherwise allowing additional light to pass through the aperture. For example, application of the power can cause the polymer to radially stretch a membrane upon which it is deposited, thereby increasing a diameter of the center portion and admitting an increased amount of light.

As another example, the dynamic variable aperture can include an electroactive polymer shaped as an opaque outer portion and an opaque center portion with a transparent annular portion concentrically formed therebetween. At least the opaque outer portion and the opaque center portion can have an refractive index of 1.0.

In some implementations, each focal length operably available through the system corresponds to a particular aperture size and, therefore, the dynamic variable aperture is controlled in concert with the variable focal length optical assembly 1102. Alternatively, the aperture size can be controlled independently of focal length and can serve as an active variable used similar to a zoom but instead impacting depth of field.

In some instances, a variable focal length optical assembly user interface 1144 communicatively coupled to the controller 1140 receives user input. The variable focal length optical assembly user interface 1144 is disposed in or on the variable focal length optical assembly 1102. In some instances, the image acquisition device user interface 1165 may be communicatively coupled to and receive user input associated with the variable focal length optical assembly 1102 in addition to or instead of the variable focal length optical assembly user interface 1144. In some instances the variable focal length optical assembly user interface 1144 may include a graphical user interface. The variable focal length optical assembly user interface 1144 may receive a user input that includes at least data indicative of the focal lengths to which the controller 1140 should adjust the variable focal length optical assembly 1102.

The image acquisition device 1160 can include any current or future developed still or cinematic image acquisition device capable of acquiring images at a rate corresponding to the frequency of the variable focal length optical assembly 1102. As discussed above, the image acquisition device includes an image capture device 1162 including any current or future developed image sensor technology. Example image capture devices 1162 include, but are not limited to: complementary-metal oxide semiconductor (CMOS) sensor(s) and charge coupled device (CCD) sensor(s). The image acquisition device 1160 may also include one or more internal and/or external nontransitory storage media 1164 for storage of image data acquired using the image capture device 1162. In some implementations, all or a portion of the nontransitory storage media 1164 may be in the form of removable nontransitory storage media (e.g., secure digital (SD), compact flash (CF), memory stick, solid-state drive (SSD), or similar). An example image acquisition device 1160 includes, but is not limited to, a Phantom v641 (offered by Phantom Camera Products, Wayne, N.J.) that includes a 4 MP CMOS Image sensor that is capable of collecting 2,560 frames per second at a 1920×1080 resolution.

Although not shown in FIG. 1B, the image acquisition device 1160 may optionally include one or more exposure control systems and/or devices. For example, the image acquisition device 1160 may include either or both an aperture or a shutter to control the duration and amount of light incident upon the image capture device 1162. Such exposure control systems may be partially or wholly implemented by the image acquisition device controller 1168. Such exposure control systems may include either or both mechanical apertures and/or shutters (e.g., metal leaf aperture, sliding plane shutter) or electronic apertures and/or shutters (e.g., LCD aperture, LCD shutter). In some instances, the exposure control system may interface with the variable focal length optical assembly controller 1144 to limit the focal length shift of the lens 1102 to a frequency permitting adequate exposure conditions (e.g., frequency shift rate may be decreased in low ambient light situations and increased in high ambient light situations). As another example, the image acquisition device 1160 can include a dynamic variable aperture as described above.

Although FIG. 1B depicts the assembly 1102 as including two deformable reflective elements, such number is provided as one example only. The assembly 1102 can include any number of deformable reflective elements or other optical elements.

The use of deformable elements 1110, 1120, and 1130 enables the use of the variable focal length optical assembly 1102 in a focal field cinematic camera. By sweeping the focal field, each focal length may be placed into a sub-frame. In this manner, a plurality of focal planes (e.g., 24 focal planes) per playback frame is possible.

Figure 2:
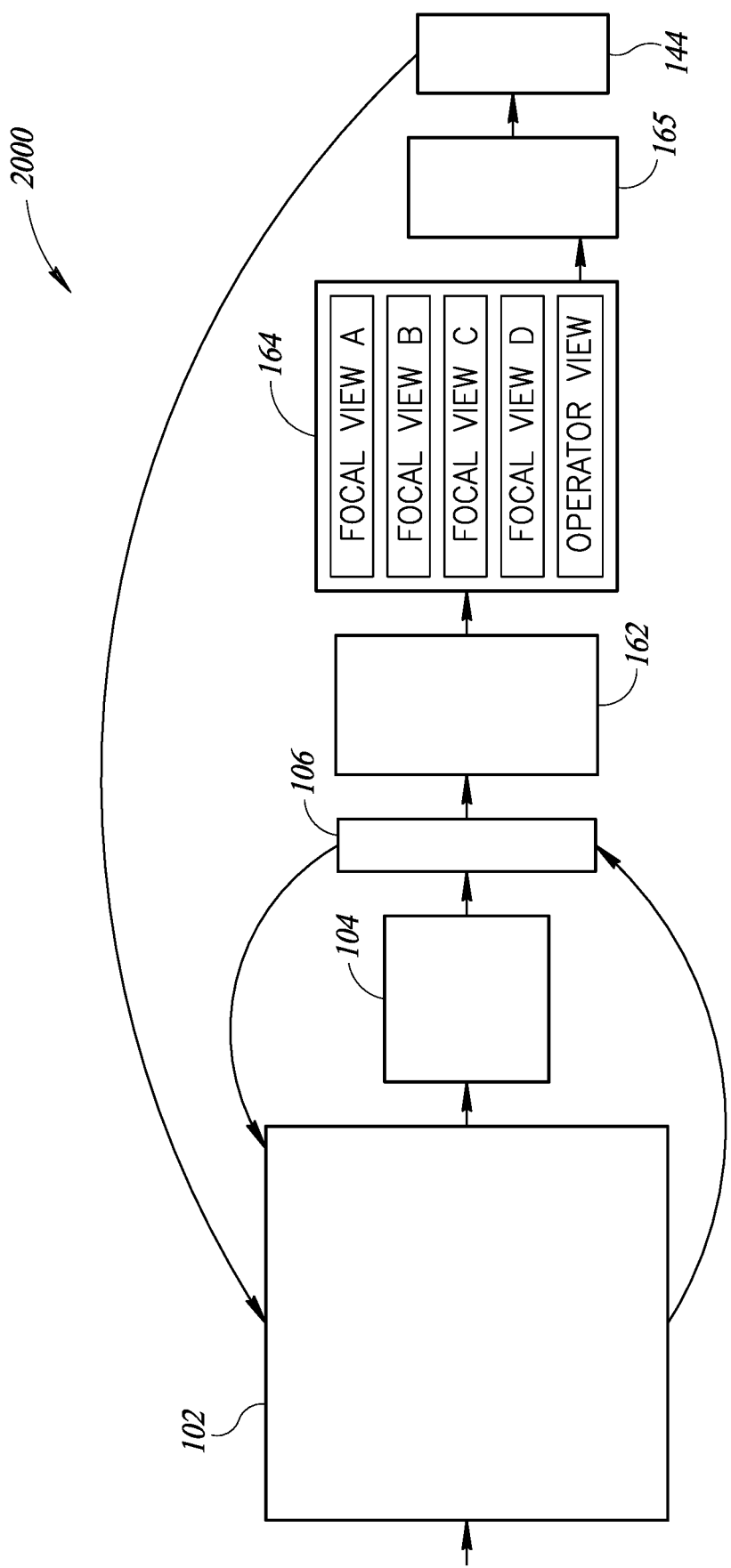
FIG. 2 is a block diagram of an example optical system that includes a variable focal length optical assembly positioned prior to a parent lens assembly in an optical path, according to at least one illustrated embodiment.

FIG. 2 is a block diagram of an example optical system 2000 that includes the variable focal length optical assembly 102 positioned prior to a parent lens assembly 104 in an optical path of the system 2000, according to at least one illustrated embodiment.

In particular, the system 2000 includes the variable focal length optical assembly 102 that is optically and operatively coupled with the parent lens assembly 104 and the image capture device 162. In some implementations, the system 2000 further includes a metadata coupler 106 positioned, for example, optically between the parent lens assembly 104 and the image capture device 162, as will be discussed further below.

The system 2000 operates to capture a plurality of images that respectively have a plurality of different focal lengths. The plurality of images are represented collectively at block 164 of FIG. 2.

In some instances, the system 2000 can be denominated as an afocal optical system. For example, in some implementations, the parent lens assembly 104 is mounted to the image acquisition device 162 and the variable focal length optical assembly 102 is removably mounted to the parent lens assembly 104.

As discussed above with reference to FIGS. 1A and 1B, the variable focal length optical assembly 102 can include one or more dynamically deformable optical elements (e.g., lens elements, reflective elements, etc.) that permit the variable focal length optical assembly 102 to rapidly and dynamically adjust a focal length provided by the assembly 102. Example structures and designs for the variable focal length optical assembly 102 are discussed further herein, including with reference to FIGS. 1B and 4-10.

Light enters the variable focal length optical assembly 102 from an exterior of the system 2000; is shaped and/or reflected by the one or more deformable optical elements of the variable focal length optical assembly 102; and then exits the variable focal length optical assembly 102.

Light that has exited the variable focal length optical assembly 102 then enters the parent lens assembly 104. The parent lens assembly 104 can include one or more lens elements or other optical elements that alter light as it travels through the parent lens assembly 104.

Typically, the lens elements or other optical elements included in the parent lens assembly 104 will be static optical elements (i.e., not dynamically deformable). In some instances, however, the parent lens assembly 104 may be adjustable to change a focal length provided by the parent lens assembly 104.

The parent lens assembly 104 can be many different types of lens assemblies associated with various devices or applications. In one example application, the parent lens assembly 104 is a standard camera lens assembly associated with a still image camera (e.g., digital camera or film exposure camera) or a cinematic camera. In some implementations, the parent lens assembly 104 is associated with a panoramic camera and/or a rotatable camera for capturing panoramic images.

In another example, the parent lens assembly 104 is an eyepiece and/or other lens assembly that is a component of an endoscope or other optical medical device. For example, the parent lens assembly 104 can be mounted or otherwise operably coupled at an ex vivo end of an endoscopy tube of the endoscope.

Thus, in one example scenario, the variable focal length optical assembly 102 can be optically positioned between an endoscopy tube and the parent lens assembly 104. Thus, the light entering the variable focal length optical assembly 102 may first have travelled through at least a portion of an endoscopy tube from an interior of a body of a patient.

Light that exits the parent lens assembly impinges upon the image capture device 162. The image capture device 162 transforms the received light into image data representative of the plurality of images 164.

FIG. 2 includes a block 164 that represents the plurality of images captured by the image capture device 162. For example, a non-transitory memory associated with the image capture device 162 can store the plurality of images 164 as they are captured by the device 162. For example, the non-transitory memory may be a component of the same image acquisition device as the image capture device 162. Alternatively or in addition to storage by a memory, the image capture device 162 can output or otherwise stream the plurality of images 164.

The system 2000 can optionally further include the display 165 and the focal length controller 144, as was described with reference to FIG. 1A.

One or both of the variable focal length optical assembly 102 and the image capture device 162 may be operatively and communicatively coupled to a controller or other processor-based device, as was discussed with reference to FIG. 1B.

In some implementations, the system 2000 includes the metadata coupler 106. For example, the metadata coupler 106 can be operatively and/or optically positioned between the parent lens assembly 104 and the image capture device 162, as illustrated. The metadata coupler 106 can be a component of the same image acquisition device as the image capture device 162 or can be an additional operatively coupled component of the system 2000. In some implementations the optical path through system 2000 passes through the metadata coupler 106 while in other implementations it does not so pass.

The metadata coupler 106 can logically associate metadata with each of the plurality of images 164. For example, such metadata can include, but is not limited to, information describing a focal length, a depth of field, a time of capture, a place of capture, and/or other information concerning the respective image. The metadata coupler 106 can format the metadata as EXIF data.

The metadata coupler 106 can include or otherwise be operatively and communicatively coupled to a controller or other processor-based device and/or a non-transitory memory. The metadata coupler 106 can be communicatively coupled to the variable focal length optical assembly 102, as illustrated in FIG. 2.

One example method of operation of system 2000 will be discussed further below with reference to FIG. 16. Many other methods of operation or example applications are possible as well, including operating the variable focal length optical assembly 102 to perform high speed autofocusing and/or operating the variable focal length optical assembly 102 to eliminate or counteract a distortion introduced, for example, by the parent lens assembly 104 (e.g., barrel distortion). For example, one or more deformable reflective elements can be deformed to provide case-specific distortion inversion.

Figure 3:
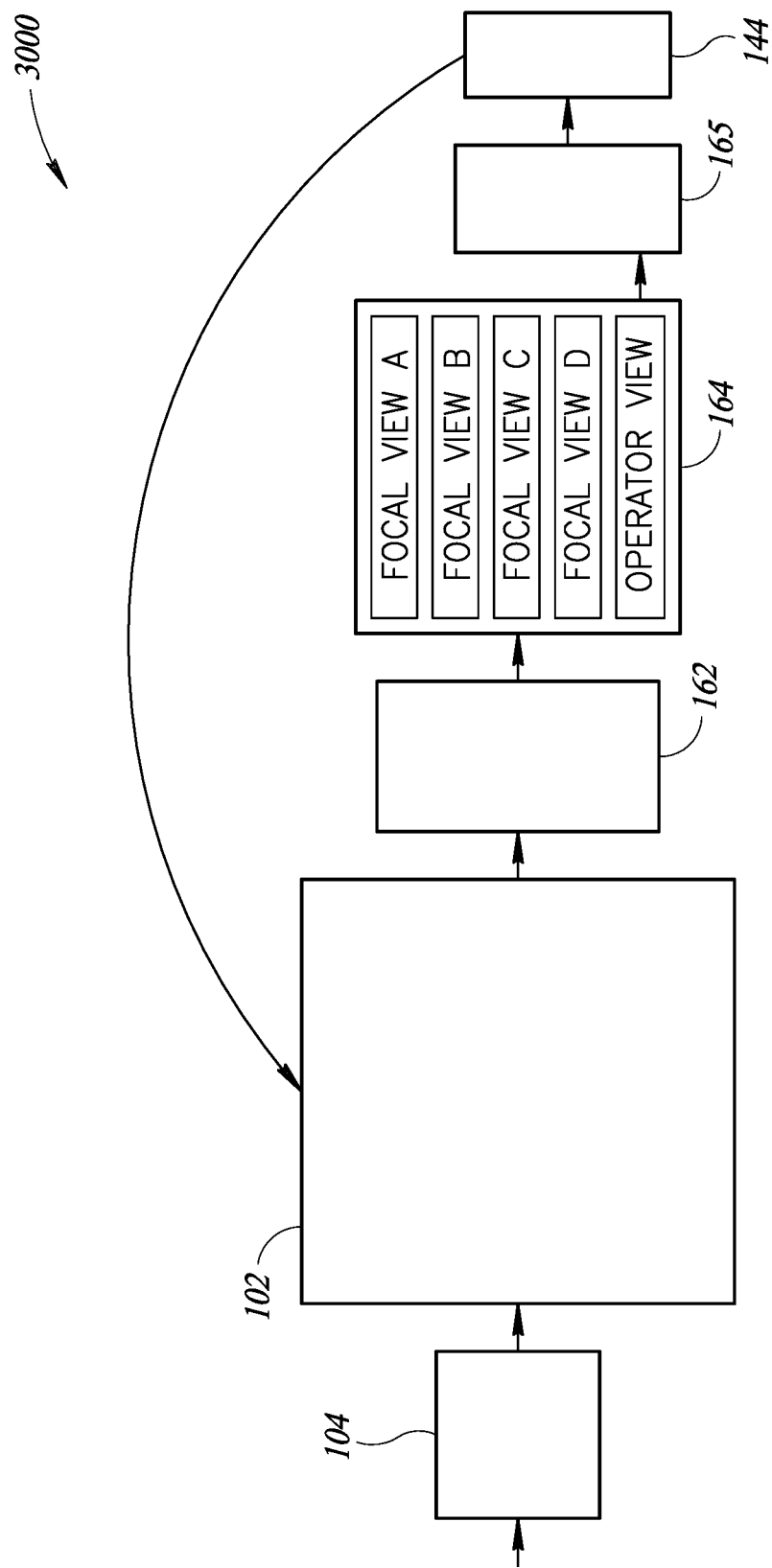
FIG. 3 is a block diagram of an example optical system that includes a parent lens assembly positioned prior to a variable focal length optical assembly in an optical path, according to at least one illustrated embodiment.

FIG. 3 is a block diagram of an example optical system 3000 that includes the parent lens assembly 104 positioned prior to the variable focal length optical assembly 102 in an optical path of the system 3000, according to at least one illustrated embodiment.

In particular, the system 3000 includes the variable focal length optical assembly 102 that is optically and operatively coupled between the parent lens assembly 104 and the image capture device 162. The system 3000 operates to capture a plurality of images that respectively have a plurality of different focal lengths. The plurality of images are represented collectively at block 164 of FIG. 3.

In some instances, the system 3000 can be denominated as an afocal optical system. For example, in some implementations, the parent lens assembly 104 is mounted to the variable focal length optical assembly 102 and the variable focal length optical assembly 102 is mounted to the image acquisition device 162.

Light enters the parent lens assembly 104 from an exterior of the system 3000; is shaped and/or reflected by one or more lenses or other optical elements of the parent lens assembly 104; and then exits the parent lens assembly 104.

Light that has exited the parent lens assembly 104 then enters the variable focal length optical assembly 102 where it is shaped and/or reflected by the one or more dynamically deformable optical elements.

In particular, as discussed above with reference to FIGS. 1A and 1B, the variable focal length optical assembly 102 can include one or more dynamically deformable optical elements that permit the variable focal length optical assembly 102 to rapidly and dynamically adjust a focal length provided by the assembly 102. Example structures and designs for the variable focal length optical assembly 102 will be discussed further below, including with reference to FIGS. 1B and 4-10. Thus, the variable focal length optical assembly 102 can dynamically deform the deformable optical elements to rapidly and dynamically adjust a focal length provided by the assembly 102, enabling capture of the plurality of images that respectively have a plurality of different focal lengths.

Light that exits the variable focal length optical assembly 102 impinges upon the image capture device 162. The image capture device 162 transforms the received light into image data representative of the plurality of images 164.

Typically, the lens elements or other optical elements included in the parent lens assembly 104 will be static optical elements (i.e., not dynamically deformable). In some instances, however, the parent lens assembly 104 may be adjustable to change a focal length provided by the parent lens assembly 104.

The parent lens assembly 104 can be many different types of lens assemblies associated with various devices or applications. In one example application, the parent lens assembly 104 is a standard camera lens assembly associated with a still image camera or a cinematic camera. In some implementations, the parent lens assembly 104 is associated with a panoramic camera and/or a rotatable camera for capturing panoramic images.

In another example, the parent lens assembly 104 is an eyepiece and/or other lens assembly that is a component of an endoscope or other optical medical device. For example, the parent lens assembly 104 can be mounted or otherwise operably coupled at an ex vivo end of an endoscopy tube of the endoscope.

Thus, in one example scenario, the variable focal length optical assembly 102 can be optically positioned subsequent to both an endoscopy tube and the parent lens assembly 104. For example, the parent lens assembly 104 can be positioned at the in vivo end of the endoscopy tube while the variable focal length optical assembly 102 is positioned at the ex vivo end. As another example, both the parent lens assembly 104 and the variable focal length optical assembly 102 can be positioned at the ex vivo end of the endoscopy tube, with the variable focal length optical assembly 102 optically positioned subsequent to the parent lens assembly 104 Thus, the light entering the variable focal length optical assembly 102 may first have travelled through at least a portion of an endoscopy tube from an interior of a body of a patient.

FIG. 3 includes a block 164 that represents the plurality of images captured by the image capture device 162. For example, a non-transitory memory associated with the image capture device 162 can store the plurality of images 164 as they are captured by the device 162. For example, the non-transitory memory may be a component of the same image acquisition device as the image capture device 162. Alternatively or in addition to storage by a memory, the image capture device 162 can output or otherwise stream the plurality of images 164.

The system 3000 can optionally further include the display 165 and the focal length controller 144, as was described with reference to FIG. 1A.

One or both of the variable focal length optical assembly 102 and the image capture device 162 may be operatively and communicatively coupled to a controller or other processor-based device, as was discussed with reference to FIG. 1B.

One example method of operation of system 3000 will be discussed further below with reference to FIG. 17. Many other methods of operation or example applications are possible as well, including operating the variable focal length optical assembly 102 to perform high speed auto-focusing and/or operating the variable focal length optical assembly 102 to eliminate or counteract a distortion introduced, for example, by the parent lens assembly 104 (e.g., barrel distortion). For example, one or more deformable reflective elements can be deformed to provide case-specific distortion inversion.

Figure 4:
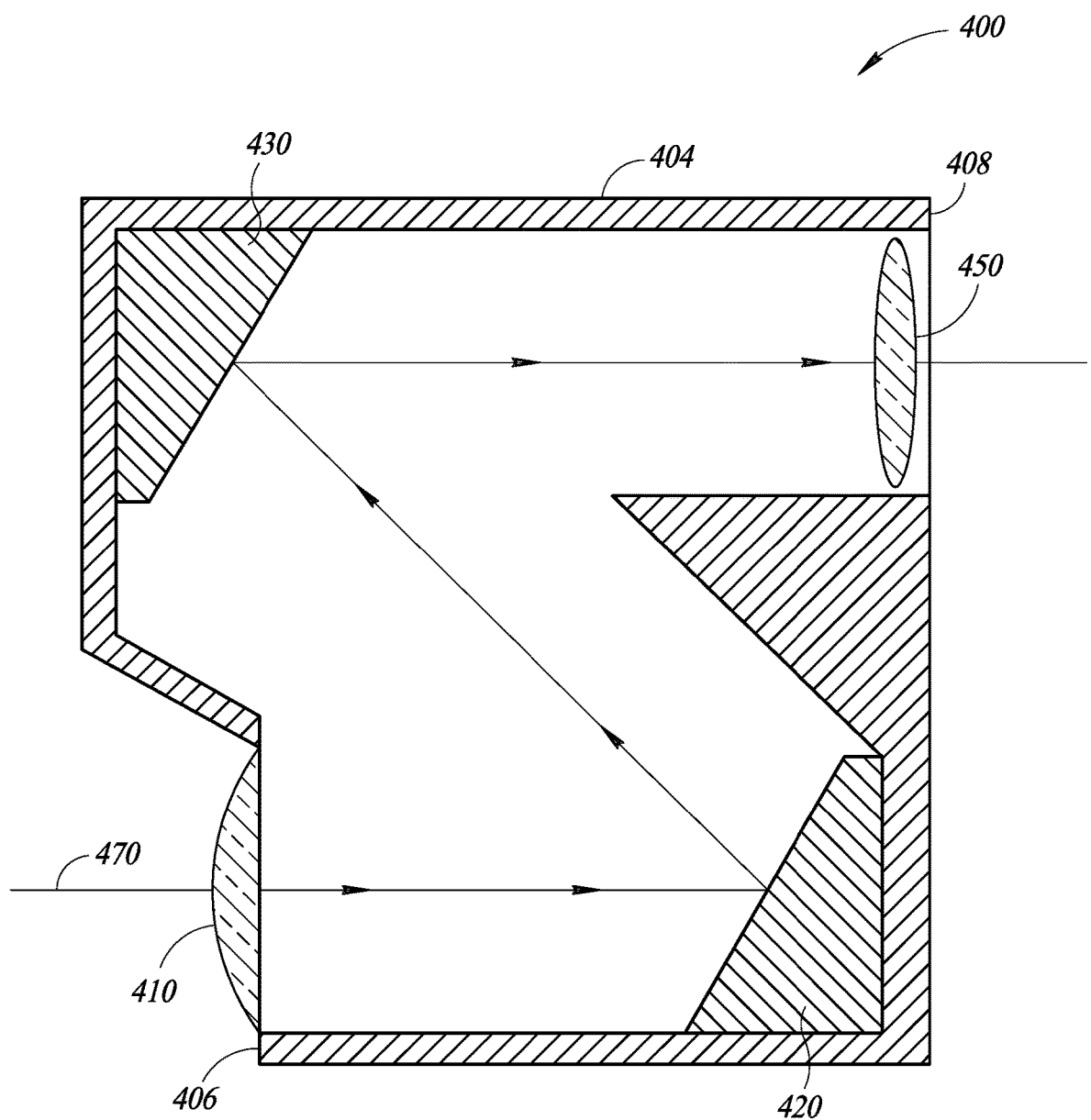
FIG. 4 is a cross-sectional diagram of an example variable focal length optical assembly, according to at least one illustrated embodiment.

FIG. 4 is a cross-sectional diagram of an example variable focal length optical assembly 400, according to at least one illustrated embodiment. In some implementations, the variable focal length optical assembly 400 may be denominated as having a "forty-five degree off axis configuration."

The variable focal length optical assembly 400 includes a housing 404 having a first end 406 and second end 408, a deformable entry lens element 410, a first deformable reflective element 420, and a second deformable reflective element 430, according to one illustrated embodiment. At least a portion of light reflected from an external scene enters the assembly 400 at the first end 406. At least a portion of the light entering the first end 406 of the housing 404 exits through the second end 408.

In some instances, the deformable entry lens element 410, the first deformable reflective element 420, and the second deformable reflective element 430 may be deformed hundreds or even thousands of times per second (i.e., at a frequency of hundreds or thousands of hertz) via the selective and controlled application of electromagnetic energy. Thus, through deformation of at least one of the deformable elements 410, 420, and/or 430, the assembly 400 is able to provide hundreds or even thousands of changes in focal length per second.

The deformable entry lens element 410 can include any type of current or future developed optically transparent or translucent lens element having a variable and/or adjustable physical configuration or geometry. In particular, the deformable entry lens element 410 can be the same as or similar to the deformable entry lens element 1110 described with reference to FIG. 1B.

The first deformable reflective element 420 can include any type of current or future developed reflective element having a variable and/or adjustable physical configuration or geometry. In particular, the first deformable reflective element 420 can be the same as or similar to the first deformable reflective element 1120 described with reference to FIG. 1B.

The second deformable reflective element 430 can include any type of current or future developed reflective element having a variable and/or adjustable physical configuration or geometry. In particular, the second deformable reflective element 430 can be the same as or similar to the second deformable reflective element 1130 described with reference to FIG. 1B.

Although not shown in FIG. 4, the variable focal length optical assembly 400 may optionally include one or more exposure control devices, including, for example, a dynamic variable aperture (not shown) as discussed above with reference to FIG. 1B.

Further, in some implementations, the variable focal length optical assembly 400 may include one or more conventional (i.e., non-deformable) lenses or lens elements 450 positioned along an optical path 470 through the variable focal length optical assembly 400.

As illustrated in FIG. 4, the optical path 470 through the variable focal length optical assembly 400 includes the first end 406 of the housing 404 via which light enters from an exterior of the housing 404; the first deformable reflective element 420 from which light reflects toward the second deformable reflective element 430; the second deformable reflective element 430 from which light reflects toward the second end 408 of the housing 404; and the second end 408 of the housing 404 from which the reflected light exits the variable focal length optical assembly 400.

In particular, as illustrated in FIG. 4, the first deformable reflective element 420 reflects light that entered the first end 406 of the housing 404 at a 225 degree angle towards the second deformable reflective element 430. The second deformable reflective element 430 reflects light reflected from the first deformable reflective element 420 at a 225 degree angle towards the second end 408 of the housing 404.

The particular off axis configuration provided by assembly 400 is one example off axis configuration. Other off axis configurations are possible as well, including, for example, configurations that include pairs of reflective elements that respectively reflect light at 240 degree and 210 degree angles or other pairs of angles that sum to 90, 450, or other suitable values. For example, any angles can be used that result in a path angle equal to 90 degrees for no pathway extension.

Although FIG. 4 depicts the assembly 400 as including two deformable reflective elements, such number is provided as one example only. The assembly 400 can include any number of deformable reflective elements or other optical elements.

Figure 5:
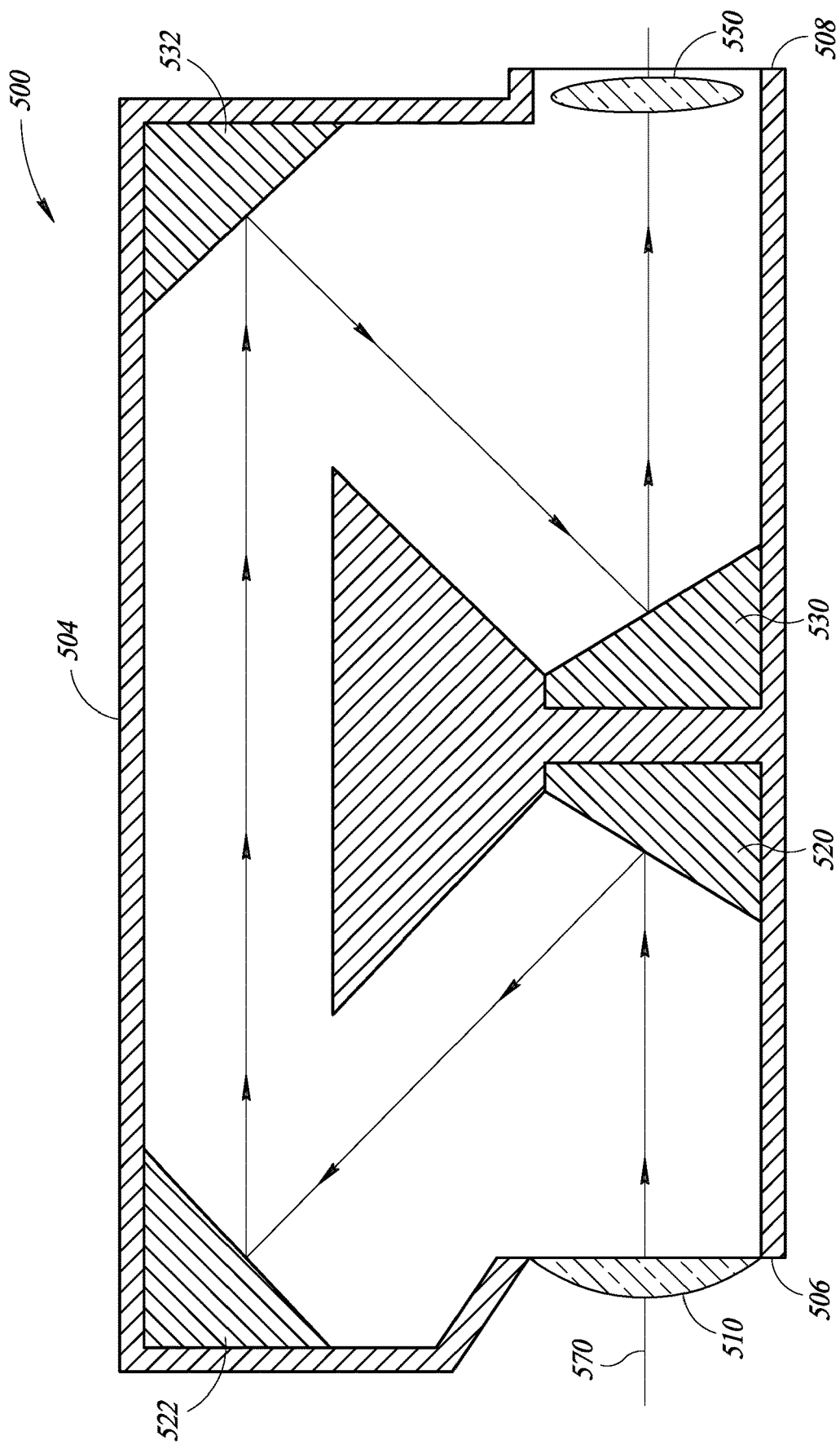
FIG. 5 is a cross-sectional diagram of an example variable focal length optical assembly, according to at least one illustrated embodiment.

FIG. 5 is a cross-sectional diagram of an example variable focal length optical assembly 500, according to at least one illustrated embodiment. In some implementations, the variable focal length optical assembly 500 may be denominated as having a "forty-five degree off axis configuration with focal length extension."

The variable focal length optical assembly 500 includes a housing 504 having a first end 506 and second end 508, a deformable entry lens element 510, a first deformable reflective element 520, and a second deformable reflective element 530, according to one illustrated embodiment. The assembly 500 further includes a first fold reflective element 522 and a second fold reflective element 532 respectively mounted to and/or received within the housing 504. At least a portion of light reflected from an external scene enters the assembly 500 at the first end 506. At least a portion of the light entering the first end 506 of the housing 504 exits through the second end 508.

In some instances, the deformable entry lens element 510, the first deformable reflective element 520, and the second deformable reflective element 530 may be deformed hundreds or even thousands of times per second (i.e., at a frequency of hundreds or thousands of hertz) via the selective and controlled application of electromagnetic energy. Thus, through deformation of at least one of the deformable elements 510, 520, and/or 530, the assembly 500 is able to provide hundreds or even thousands of changes in focal length per second.

The deformable entry lens element 510 can include any type of current or future developed optically transparent or translucent lens element having a variable and/or adjustable physical configuration or geometry. In particular, the deformable entry lens element 510 can be the same as or similar to the deformable entry lens element 1110 described with reference to FIG. 1B.

The first deformable reflective element 520 can include any type of current or future developed reflective element having a variable and/or adjustable physical configuration or geometry. In particular, the first deformable reflective element 520 can be the same as or similar to the first deformable reflective element 1120 described with reference to FIG. 1B.

The second deformable reflective element 530 can include any type of current or future developed reflective element having a variable and/or adjustable physical configuration or geometry. In particular, the second deformable reflective element 530 can be the same as or similar to the second deformable reflective element 1130 described with reference to FIG. 1B.

The first fold reflective element 522 and the second fold reflective element 532 can fold and reflect light. For example the first and the second fold reflective elements 522 and 532 can be fold mirrors or other types of mirrors.

Although not shown in FIG. 5, the variable focal length optical assembly 500 may optionally include one or more exposure control devices, including, for example, a dynamic variable aperture (not shown) as discussed above with reference to FIG. 1B.

Further, in some implementations, the variable focal length optical assembly 500 may include one or more conventional (i.e., non-deformable) lenses or lens elements 550 positioned along an optical path 570 through the variable focal length optical assembly 500.

As illustrated in FIG. 5, the optical path 570 through the variable focal length optical assembly 500 extends from the first deformable reflective element 520 to the first fold reflective element 522, from the first fold reflective element 522 to the second fold reflective element 532, and from the second fold reflective element 532 to the second deformable reflective element 530.

In particular, the first deformable reflective element 520 reflects light that has entered the first end 506 of the housing 504 from an exterior of the housing 504 at a 225 degree angle towards the first fold reflective element 522, the first fold reflective element 522 reflects light reflected by the first deformable element 520 at a 225 degree angle towards the second fold reflective mirror 532, the second fold reflective element 532 reflects light reflected by the first fold reflective element 522 at a 225 degree angle towards the second deformable reflective element 530, and the second deformable reflective element 530 reflects light reflected from the second fold reflective element 532 at a 225 degree angle towards the second end 508 of the housing 504.

The particular off axis configuration provided by assembly 500 is one example off axis configuration. Other off axis configurations are possible as well, including, for example, configurations that include pairs of reflective elements that respectively reflect light at 240 degree and 210 degree angles or other pairs of angles that sum to 90, 450, or other suitable values. For example, any angles can be used that result in a path angle equal to 90 degrees for no pathway extension.

Although FIG. 5 depicts the assembly 500 as including two deformable reflective elements and two fold reflective elements, such quantities are provided as one example only. The assembly 500 can include any number of deformable reflective elements, fold reflective elements, or other optical elements.

Figure 6:
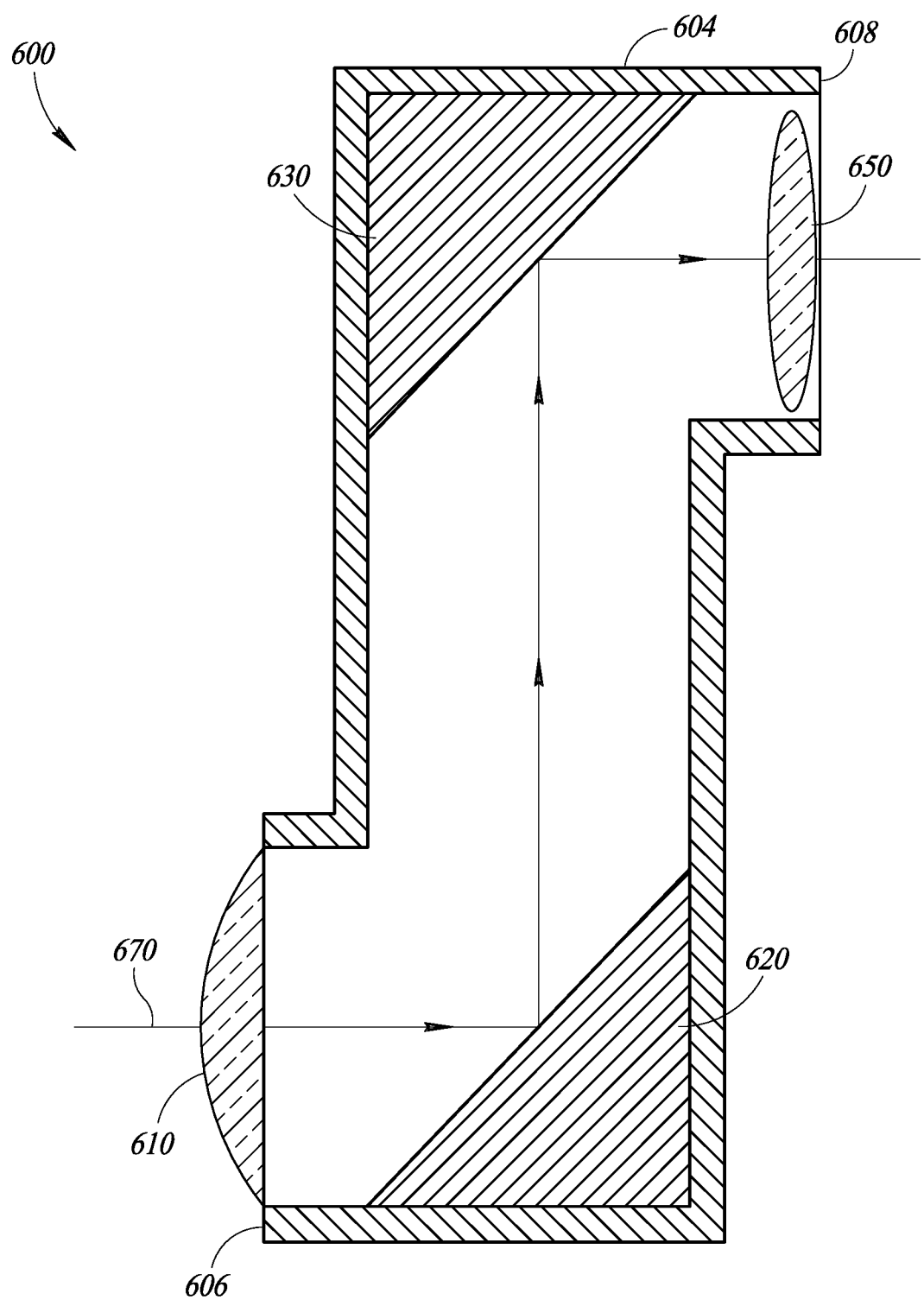
FIG. 6 is a cross-sectional diagram of an example variable focal length optical assembly, according to at least one illustrated embodiment.

FIG. 6 is a cross-sectional diagram of an example variable focal length optical assembly 600, according to at least one illustrated embodiment. In some implementations, the variable focal length optical assembly 600 may be denominated as having a "ninety degree off axis configuration."

The variable focal length optical assembly 600 includes a housing 604 having a first end 606 and second end 608, a deformable entry lens element 610, a first deformable reflective element 620, and a second deformable reflective element 630, according to one illustrated embodiment. At least a portion of light reflected from an external scene enters the assembly 600 at the first end 606. At least a portion of the light entering the first end 606 of the housing 604 exits through the second end 608.

In some instances, the deformable entry lens element 610, the first deformable reflective element 620, and the second deformable reflective element 630 may be deformed hundreds or even thousands of times per second (i.e., at a frequency of hundreds or thousands of hertz) via the selective and controlled application of electromagnetic energy. Thus, through deformation of at least one of the deformable elements 610, 620, and/or 630, the assembly 600 is able to provide hundreds or even thousands of changes in focal length per second.

The deformable entry lens element 610 can include any type of current or future developed optically transparent or translucent lens element having a variable and/or adjustable physical configuration or geometry. In particular, the deformable entry lens element 610 can be the same as or similar to the deformable entry lens element 1110 described with reference to FIG. 1B.

The first deformable reflective element 620 can include any type of current or future developed reflective element having a variable and/or adjustable physical configuration or geometry. In particular, the first deformable reflective element 620 can be the same as or similar to the first deformable reflective element 1120 described with reference to FIG. 1B.

The second deformable reflective element 630 can include any type of current or future developed reflective element having a variable and/or adjustable physical configuration or geometry. In particular, the second deformable reflective element 630 can be the same as or similar to the second deformable reflective element 1130 described with reference to FIG. 1B.

Although not shown in FIG. 6, the variable focal length optical assembly 600 may optionally include one or more exposure control devices, including, for example, a dynamic variable aperture (not shown) as discussed above with reference to FIG. 1B.

Further, in some implementations, the variable focal length optical assembly 600 may include one or more conventional (i.e., non-deformable) lenses or lens elements 650 positioned along an optical path 670 through the variable focal length optical assembly 600.

As illustrated in FIG. 6, the optical path 670 through the variable focal length optical assembly 600 includes the first end 606 of the housing 604 via which light enters from an exterior of the housing 604; the first deformable reflective element 620 from which light reflects toward the second deformable reflective element 630; the second deformable reflective element 630 from which light reflects toward the second end 608 of the housing 604; and the second end 608 of the housing 604 from which the reflected light exits the variable focal length optical assembly 600.

In particular, as illustrated in FIG. 6, the first deformable reflective element 620 reflects light that entered the first end 606 of the housing 604 at a 90 degree angle towards the second deformable reflective element 630. The second deformable reflective element 630 reflects light reflected from the first deformable reflective element 620 at a 90 degree angle towards the second end 608 of the housing 604.

The particular off axis configuration provided by assembly 600 is one example off axis configuration. Other off axis configurations are possible as well, including, for example, configurations that include pairs of reflective elements that respectively reflect light at 240 degree and 210 degree angles or other pairs of angles that sum to 90, 450, or other suitable values. For example, any angles can be used that result in a path angle equal to 90 degrees for no pathway extension.

Although FIG. 6 depicts the assembly 600 as including two deformable reflective elements, such quantity is provided as one example only. The assembly 600 can include any number of deformable reflective elements or other optical elements.

Figure 7:
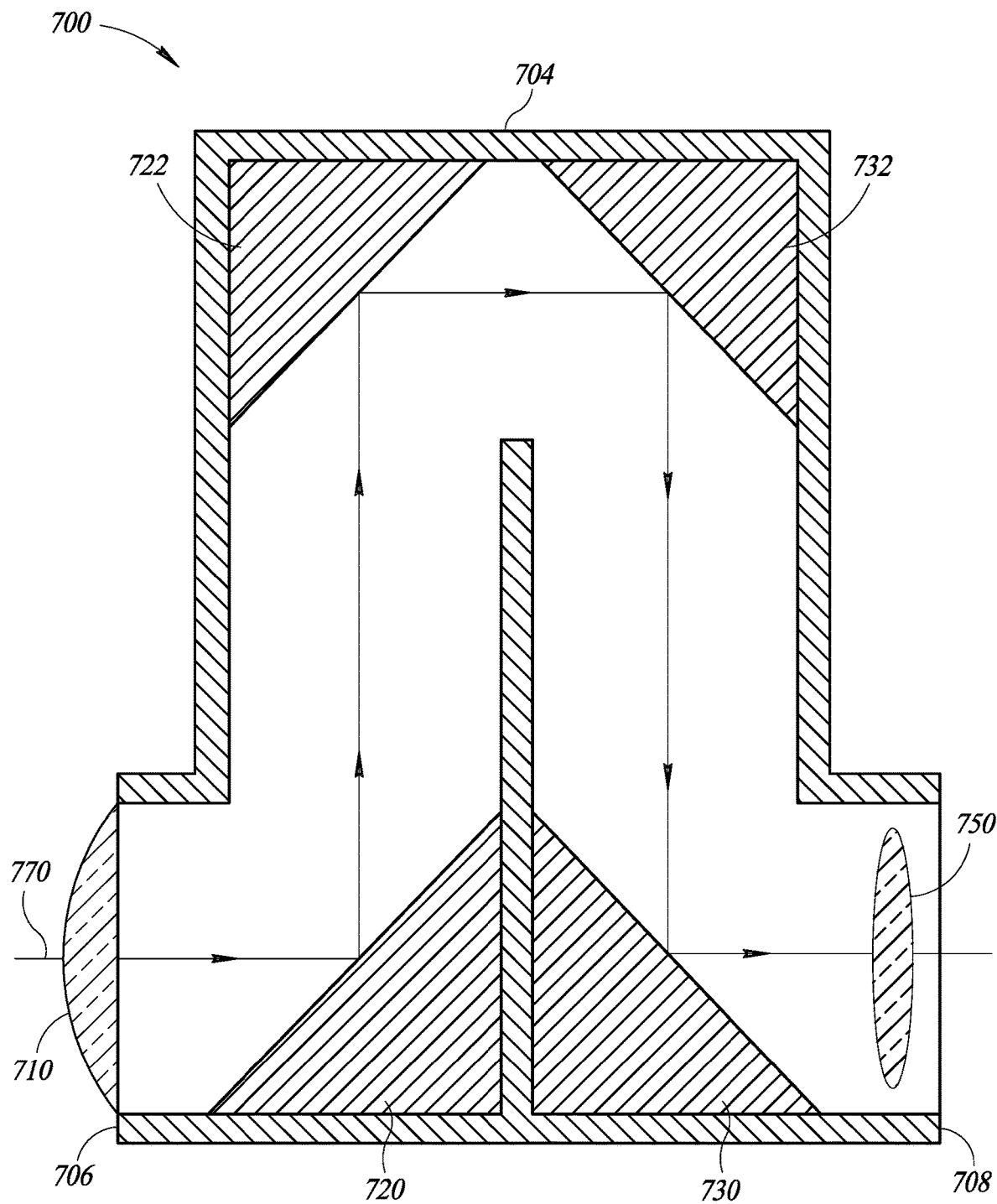
FIG. 7 is a cross-sectional diagram of an example variable focal length optical assembly, according to at least one illustrated embodiment.

FIG. 7 is a cross-sectional diagram of an example variable focal length optical assembly 700, according to at least one illustrated embodiment. In some implementations, the variable focal length optical assembly 700 may be denominated as having a "ninety degree off axis configuration with focal length extension."

The variable focal length optical assembly 700 includes a housing 704 having a first end 706 and second end 708, a deformable entry lens element 710, a first deformable reflective element 720, and a second deformable reflective element 730, according to one illustrated embodiment. The assembly 700 further includes a first fold reflective element 722 and a second fold reflective element 732 respectively mounted to and/or received within the housing 704. At least a portion of light reflected from an external scene enters the assembly 700 at the first end 706. At least a portion of the light entering the first end 706 of the housing 704 exits through the second end 708.

In some instances, the deformable entry lens element 710, the first deformable reflective element 720, and the second deformable reflective element 730 may be deformed hundreds or even thousands of times per second (i.e., at a frequency of hundreds or thousands of hertz) via the selective and controlled application of electromagnetic energy. Thus, through deformation of at least one of the deformable elements 710, 720, and/or 730, the assembly 700 is able to provide hundreds or even thousands of changes in focal length per second.

The deformable entry lens element 710 can include any type of current or future developed optically transparent or translucent lens element having a variable and/or adjustable physical configuration or geometry. In particular, the deformable entry lens element 710 can be the same as or similar to the deformable entry lens element 1110 described with reference to FIG. 1B.

The first deformable reflective element 720 can include any type of current or future developed reflective element having a variable and/or adjustable physical configuration or geometry. In particular, the first deformable reflective element 720 can be the same as or similar to the first deformable reflective element 1120 described with reference to FIG. 1B.

The second deformable reflective element 730 can include any type of current or future developed reflective element having a variable and/or adjustable physical configuration or geometry. In particular, the second deformable reflective element 730 can be the same as or similar to the second deformable reflective element 1130 described with reference to FIG. 1B.

The first fold reflective element 722 and the second fold reflective element 732 can fold and reflect light. For example the first and the second fold reflective elements 722 and 732 can be fold mirrors or other types of mirrors.

Although not shown in FIG. 7, the variable focal length optical assembly 700 may optionally include one or more exposure control devices, including, for example, a dynamic variable aperture (not shown) as discussed above with reference to FIG. 1B.

Further, in some implementations, the variable focal length optical assembly 700 may include one or more conventional (i.e., non-deformable) lenses or lens elements 750 positioned along an optical path 770 through the variable focal length optical assembly 700.

As illustrated in FIG. 7, the optical path 770 through the variable focal length optical assembly 700 extends from the first deformable reflective element 720 to the first fold reflective element 722, from the first fold reflective element 722 to the second fold reflective element 732, and from the second fold reflective element 732 to the second deformable reflective element 730.

In particular, the first deformable reflective element 720 reflects light that has entered the first end 706 of the housing 704 from an exterior of the housing 704 at a 90 degree angle towards the first fold reflective element 722, the first fold reflective element 722 reflects light reflected by the first deformable element 720 at a 90 degree angle towards the second fold reflective mirror 732, the second fold reflective element 732 reflects light reflected by the first fold reflective element 722 at a 90 degree angle towards the second deformable reflective element 730, and the second deformable reflective element 730 reflects light reflected from the second fold reflective element 732 at a 90 degree angle towards the second end 708 of the housing 704.

The particular off axis configuration provided by assembly 700 is one example off axis configuration. Other off axis configurations are possible as well, including, for example, configurations that include pairs of reflective elements that respectively reflect light at 240 degree and 210 degree angles or other pairs of angles that sum to 90, 450, or other suitable values. For example, any angles can be used that result in a path angle equal to 90 degrees for no pathway extension.

Although FIG. 7 depicts the assembly 700 as including two deformable reflective elements and two fold reflective elements, such quantities are provided as one example only. The assembly 700 can include any number of deformable reflective elements, fold reflective elements, or other optical elements.

Figure 8:
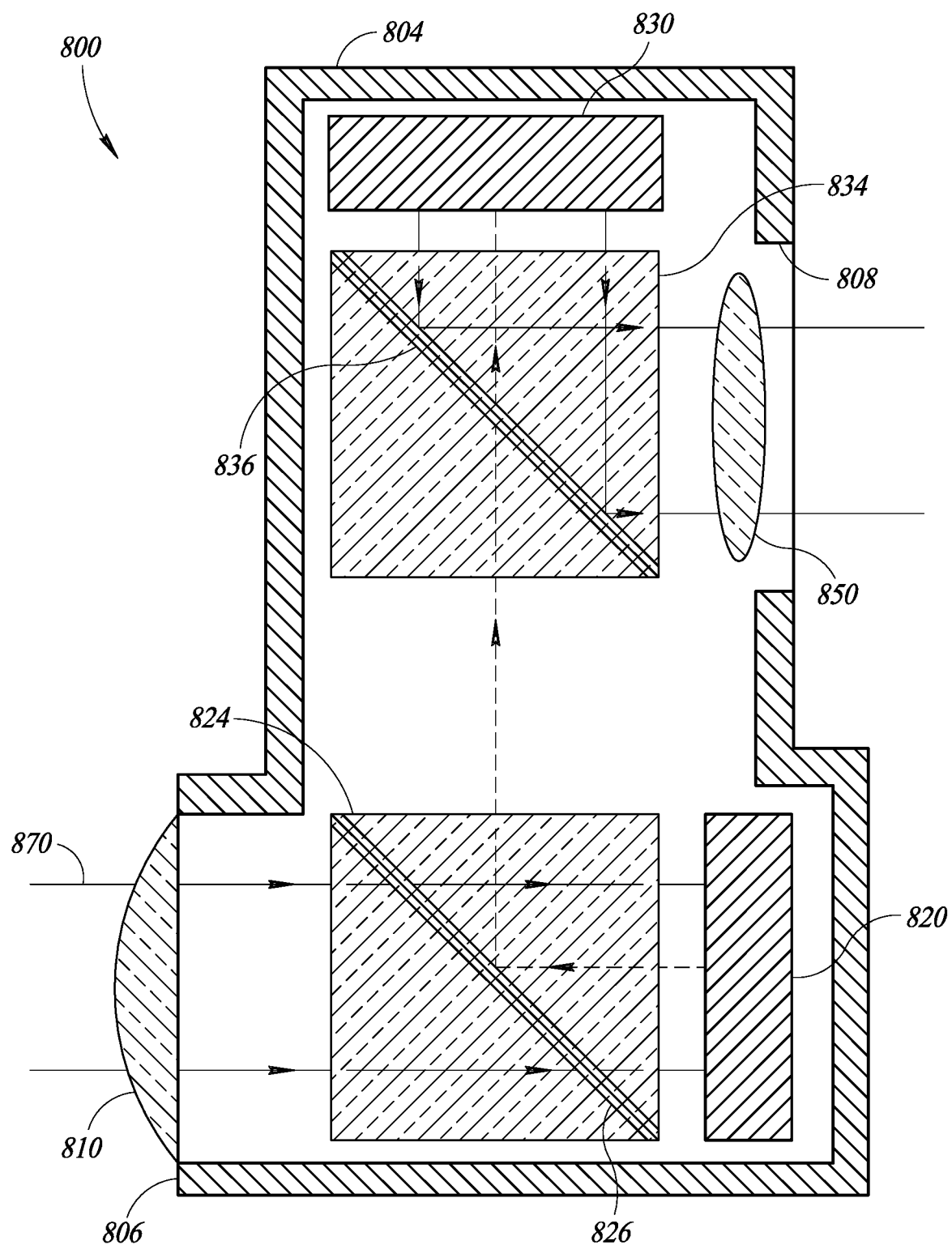
FIG. 8 is a cross-sectional diagram of an example variable focal length optical assembly, according to at least one illustrated embodiment.

FIG. 8 is a cross-sectional diagram of an example variable focal length optical assembly 800, according to at least one illustrated embodiment. In some implementations, the variable focal length optical assembly 800 may be denominated as having an "on axis configuration."

The variable focal length optical assembly 800 includes a housing 804 having a first end 806 and second end 808, a deformable entry lens element 810, a first deformable reflective element 820, and a second deformable reflective element 830, according to one illustrated embodiment. The assembly 800 further includes a first optical isolator 824 that has a first selectively reflective element 826 and a second optical isolator 834 that has a second selectively reflective element 836. At least a portion of light reflected from an external scene enters the assembly 800 at the first end 806. At least a portion of the light entering the first end 806 of the housing 804 exits through the second end 808.

In some instances, the deformable entry lens element 810, the first deformable reflective element 820, and the second deformable reflective element 830 may be deformed hundreds or even thousands of times per second (i.e., at a frequency of hundreds or thousands of hertz) via the selective and controlled application of electromagnetic energy. Thus, through deformation of at least one of the deformable elements 810, 820, and/or 830, the assembly 800 is able to provide hundreds or even thousands of changes in focal length per second.

The deformable entry lens element 810 can include any type of current or future developed optically transparent or translucent lens element having a variable and/or adjustable physical configuration or geometry. In particular, the deformable entry lens element 810 can be the same as or similar to the deformable entry lens element 1110 described with reference to FIG. 1B.

The first deformable reflective element 820 can include any type of current or future developed reflective element having a variable and/or adjustable physical configuration or geometry. In particular, the first deformable reflective element 820 can be the same as or similar to the first deformable reflective element 1120 described with reference to FIG. 1B.

The second deformable reflective element 830 can include any type of current or future developed reflective element having a variable and/or adjustable physical configuration or geometry. In particular, the second deformable reflective element 830 can be the same as or similar to the second deformable reflective element 1130 described with reference to FIG. 1B.

The first optical isolator 824 and the second optical isolator 834 can be any optical components that include elements that selectively allows transmission of light that approaches from a first direction while selectively reflecting light that approaches from a second, different direction. As an example, as illustrated in FIG. 8, the first selectively reflective element 826 transmits light approaching the first selectively reflective element 826 from the first end 806 but reflects light approaching the first selectively reflective element 826 from the first deformable reflective element 820.

Although not shown in FIG. 8, the variable focal length optical assembly 800 may optionally include one or more exposure control devices, including, for example, a dynamic variable aperture (not shown) as discussed above with reference to FIG. 1B.

Further, in some implementations, the variable focal length optical assembly 800 may include one or more conventional (i.e., non-deformable) lenses or lens elements 850 positioned along an optical path 870 through the variable focal length optical assembly 800.

As illustrated in FIG. 8, the optical path 870 through the variable focal length optical assembly 800 extends from the first deformable reflective element 820 to the first isolator 824, from the first isolator 824 to the second deformable reflective element 830, and from the second deformable reflective element 830 to the second isolator 834.

In particular, the first deformable reflective element 820 reflects light that has entered the first end 806 of the housing 804 from an exterior of the housing 804 and passed through the first selectively reflective element 826 at a 180 degree angle towards the first selectively reflective element 826, the first selectively reflective element 826 reflects light that has been reflected by the first deformable reflective element 820 at a 90 degree angle towards the second selectively reflective element 836 and towards the second deformable reflective element 830, the second deformable reflective element 830 reflects light that has been reflected by the first selectively reflective element 826 and passed through the second selectively reflective element 836 at a 180 degree angle towards the second selectively reflective element 836, and the second selectively reflective element 836 reflects light that has been reflected by the second deformable element 830 at a 90 degree angle towards the second end 808 of the housing 804.

Although FIG. 8 depicts the assembly 800 as including two deformable reflective elements and two optical isolators, such quantities are provided as one example only. The assembly 800 can include any number of deformable reflective elements, optical isolators, or other optical elements.

Figure 9:
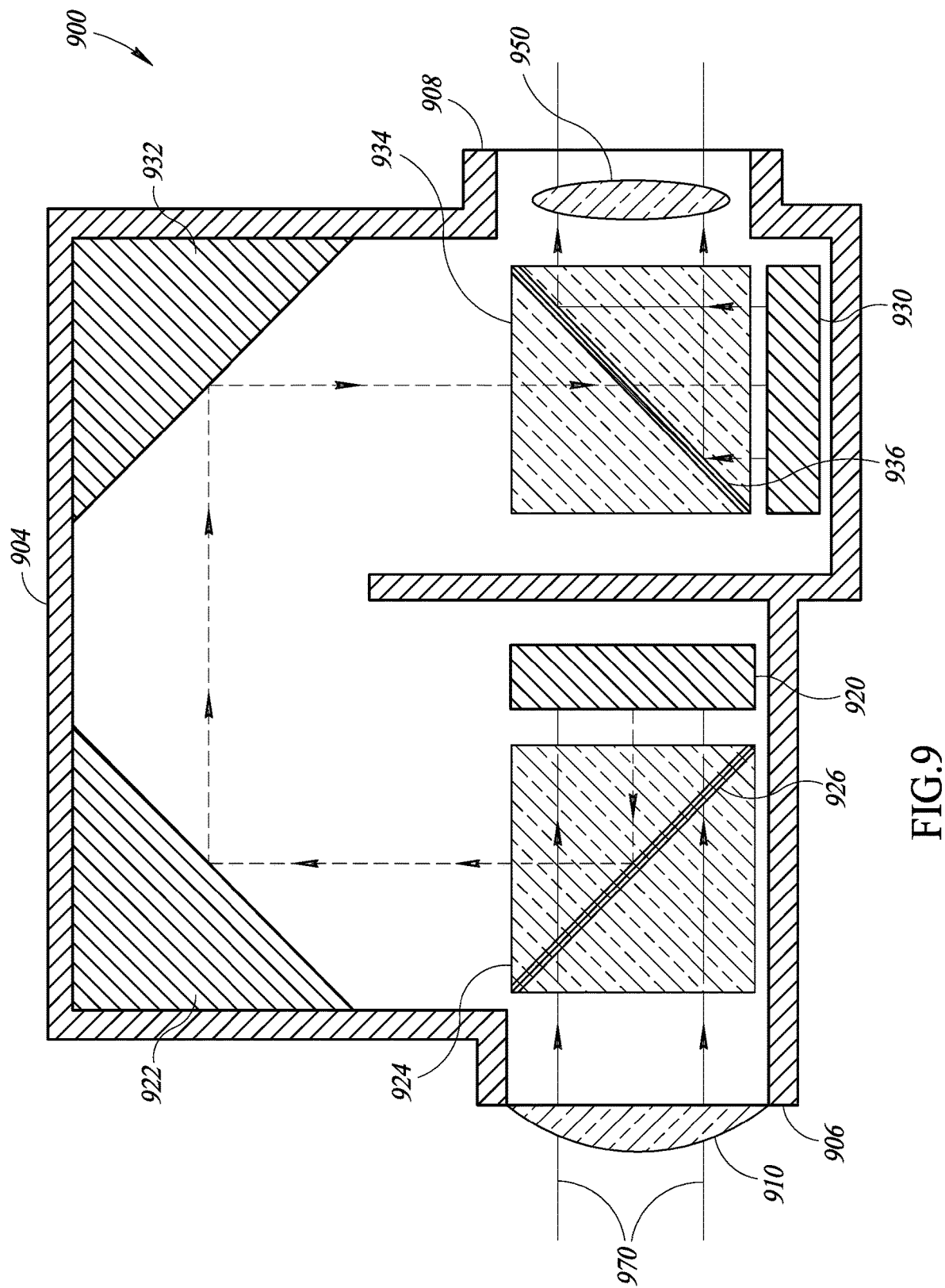
FIG. 9 is a cross-sectional diagram of an example variable focal length optical assembly, according to at least one illustrated embodiment.

FIG. 9 is a cross-sectional diagram of an example variable focal length optical assembly 900, according to at least one illustrated embodiment. In some implementations, the variable focal length optical assembly 900 may be denominated as having an "on axis configuration with focal length extension."

The variable focal length optical assembly 900 includes a housing 904 having a first end 906 and second end 908, a deformable entry lens element 910, a first deformable reflective element 920, and a second deformable reflective element 930, according to one illustrated embodiment. The assembly 900 further includes a first fold reflective element 922 and a second fold reflective element 932 respectively mounted to and/or received within the housing 904. The assembly 900 further includes a first optical isolator 924 that has a first selectively reflective element 926 and a second optical isolator 934 that has a second selectively reflective element 936. At least a portion of light reflected from an external scene enters the assembly 900 at the first end 906. At least a portion of the light entering the first end 906 of the housing 904 exits through the second end 908.

In some instances, the deformable entry lens element 910, the first deformable reflective element 920, and the second deformable reflective element 930 may be deformed hundreds or even thousands of times per second (i.e., at a frequency of hundreds or thousands of hertz) via the selective and controlled application of electromagnetic energy. Thus, through deformation of at least one of the deformable elements 910, 920, and/or 930, the assembly 900 is able to provide hundreds or even thousands of changes in focal length per second.

The deformable entry lens element 910 can include any type of current or future developed optically transparent or translucent lens element having a variable and/or adjustable physical configuration or geometry. In particular, the deformable entry lens element 910 can be the same as or similar to the deformable entry lens element 1110 described with reference to FIG. 1B.

The first deformable reflective element 920 can include any type of current or future developed reflective element having a variable and/or adjustable physical configuration or geometry. In particular, the first deformable reflective element 920 can be the same as or similar to the first deformable reflective element 1120 described with reference to FIG. 1B.

The second deformable reflective element 930 can include any type of current or future developed reflective element having a variable and/or adjustable physical configuration or geometry. In particular, the second deformable reflective element 930 can be the same as or similar to the second deformable reflective element 1130 described with reference to FIG. 1B.

The first fold reflective element 922 and the second fold reflective element 732 can fold and reflect light. For example the first and the second fold reflective elements 722 and 732 can be fold mirrors or other types of mirrors.

The first optical isolator 924 and the second optical isolator 934 can be any optical components that include elements that selectively allows transmission of light that approaches from a first direction while selectively reflecting light that approaches from a second, different direction. As an example, as illustrated in FIG. 9, the first selectively reflective element 926 transmits light approaching the first selectively reflective element 926 from the first end 906 but reflects light approaching the first selectively reflective element 926 from the first deformable reflective element 920.

Although not shown in FIG. 9, the variable focal length optical assembly 900 may optionally include one or more exposure control devices, including, for example, a dynamic variable aperture (not shown) as discussed above with reference to FIG. 1B.

Further, in some implementations, the variable focal length optical assembly 900 may include one or more conventional (i.e., non-deformable) lenses or lens elements 950 positioned along an optical path 970 through the variable focal length optical assembly 900.

As illustrated in FIG. 9, the optical path 970 through the variable focal length optical assembly 900 extends from the first deformable reflective element 920 to the first selectively reflective element 926, from the first selectively reflective element 926 to the first fold reflective element 922, from the first fold reflective element 922 to the second fold reflective element 932, from the second fold reflective element 932 through the second selectively reflective element 936 to the second deformable reflective element 930, and from the second deformable reflective element 930 to the second selectively reflective element 936.

In particular, the first deformable reflective element 920 reflects light that has entered the first end 906 of the housing 904 from an exterior of the housing 904 and passed through the first selectively reflective element 926 at a 180 degree angle towards the first selectively reflective element 926, the first selectively reflective element 926 reflects light that has been reflected by the first deformable reflective element 920 at a 90 degree angle towards the first fold reflective element 922, the first fold reflective element 922 reflects light that has been reflected by the first selectively reflective element 926 at a 90 degree angle towards the second fold reflective element 932, the second fold reflective element 932 reflects light that has been reflected by the first fold reflective element 922 at a 90 degree angle towards the second selectively reflective element 936 and towards the second deformable reflective element 930, the second deformable reflective element 930 reflects light that has been reflected by the second fold reflective element 932 and passed through the second selectively reflective element 936 at a 180 degree angle towards the second selectively reflective element 936, and the second selectively reflective element 936 reflects light that has been reflected by the second deformable element 930 at a 90 degree angle towards the second end 908 of the housing 904.

Although FIG. 9 depicts the assembly 900 as including two deformable reflective elements, two fold reflective elements, and two optical isolators, such quantities are provided as one example only. The assembly 900 can include any number of deformable reflective elements, fold reflective elements, optical isolators, or other optical elements.

Figure 10:
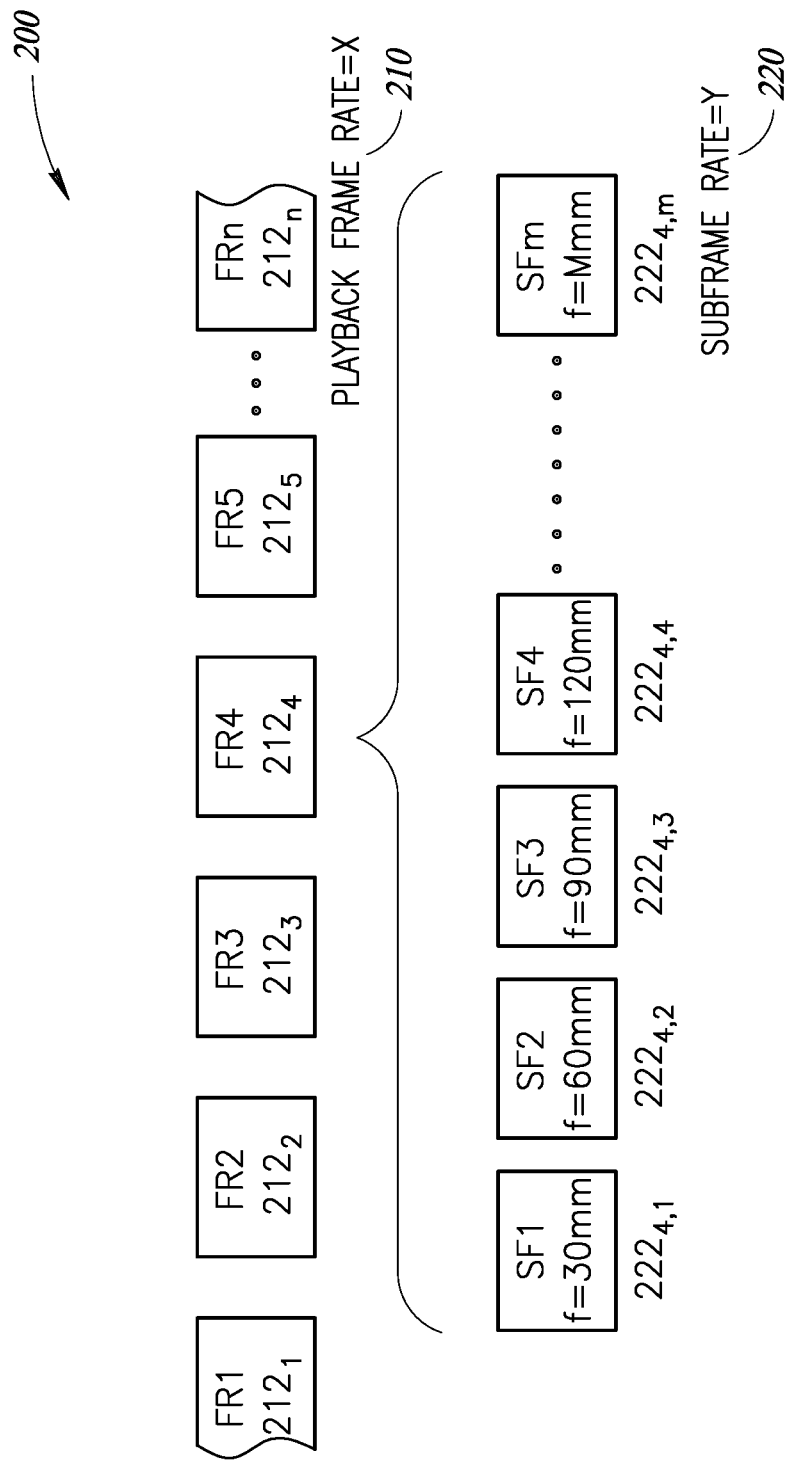
FIG. 10 is a schematic diagram showing an example relationship between frames of a motion picture and the sub-frames associated with each of the frames of the motion picture, according to at least one illustrated embodiment.

FIG. 10 shows a schematic diagram 200 illustrating the relationship between a first (e.g., playback) frame rate 210 and image/sub-frame frame rate 220, according to one illustrated embodiment. Although diagram 200 will be discussed with reference to system 1100 of FIG. 1B, the principles illustrated in and discussed with reference to FIG. 10 are equally applicable to all systems and methods of the present disclosure, including systems 100, 2000, and 3000.

As discussed above, the focal length shift rate of the variable focal length optical assembly 1102 exceeds the first frame rate 210 thereby permitting the acquisition of a plurality of images/sub-frames $222_1$-$222_m$ (collectively, "images/sub-frames 222") for each playback frame $212_1$-$212_n$ (collectively, "playback frames 212"). For clarity and ease of discussion, specific images/sub-frames 222 will from here on out be identified using two subscripts "n" and "m" where "n" corresponds to the parent playback frame $212_n$ with which the image/sub-frame $222_{n,m}$ is associated and "m" corresponds to a specific sub-frame $222_{n,m}$ in the sequence of sub-frames 222 associated with the single parent playback frame. Thus, as depicted in FIG. 10, the images/sub-frames labeled $222_{4,1}$-$222_{4,m}$ are associated with playback frame $212_4$.

Each of the "m" images/sub-frames 222 are acquired at a defined number of different focal lengths. Thus, for example, image/sub-frame $222_{x,1}$ (the first image/sub-frame 222 associated with playback frame "x") may be acquired at a focal length of 30 mm, while image/sub-frame $222_{x,10}$ (the tenth image/sub-frame 222 associated with playback frame "x") may be acquired at a focal length of 300 mm. The intervening images/sub-frames $222_{x,2}$ to $222_{x,9}$ may be acquired at incremental 30 mm changes in focal length (i.e., 60 mm, 90 mm . . . 270 mm). In some implementations, the sequence of focal lengths are the same for some or all of the playback frames 212. In such implementations, the focal length of image/sub-frame $222_{x,2}$ will be the same as the focal length of image/sub-frame $222_{y,2}$.

The theoretical maximum number of images/sub-frames 222 for each playback frame 212 is determined by dividing the image/sub-frame acquisition rate 220 by the first or playback frame rate 210. As discussed above, a lag associated with exposure adjustments by the variable focal length optical assembly 1102 or image acquisition device 1160 may reduce the theoretical maximum number of images/sub-frames 222 per playback frame 212 to a lesser number.

Figure 11:
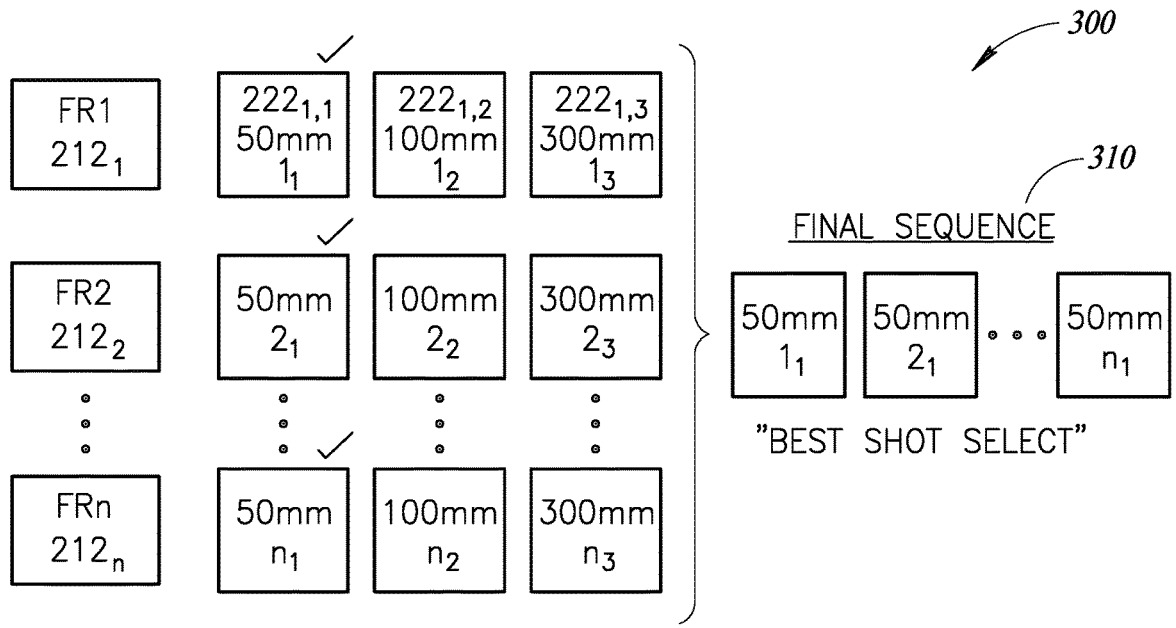
FIG. 11 is a schematic diagram showing an example post-processing editing system, according to at least one illustrated embodiment.
Figure 11:
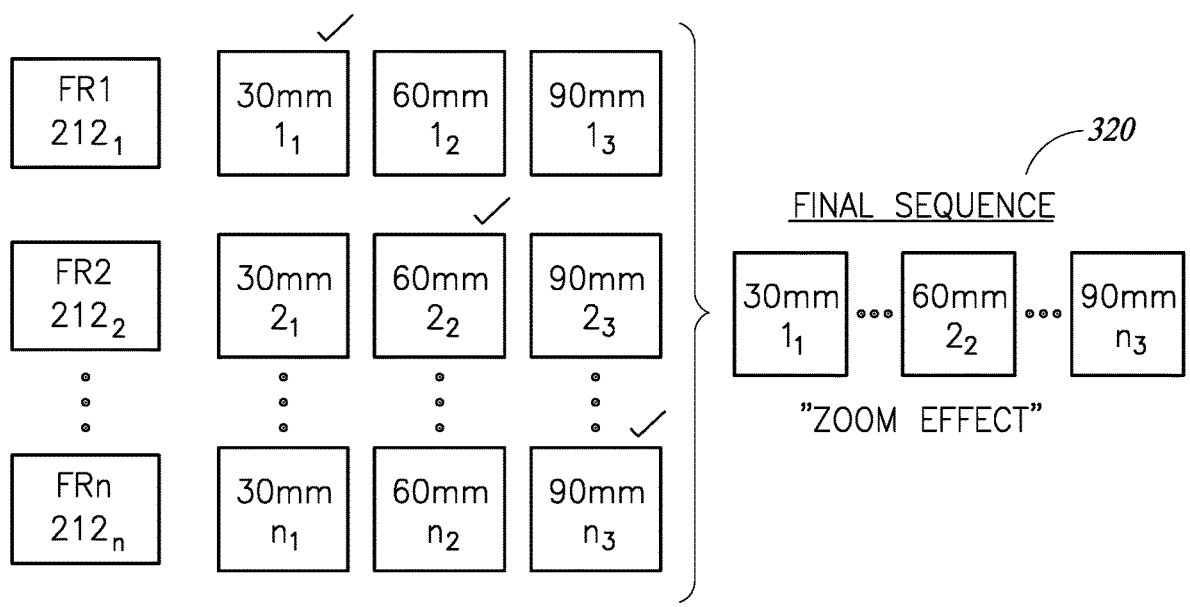

FIG. 11 shows a schematic diagram 300 illustrating two ways the images/sub-frames 222 may be used to provide a "best shot" selection 310 and a "zoom effect" selection 320, according to one illustrated embodiment. Although diagram 300 will be discussed with reference to system 1100 of FIG. 1B, the principles illustrated in and discussed with reference to FIG. 11 are equally applicable to all systems and methods of the present disclosure, including systems 100, 2000, and 3000.

Each playback frame 212 has an associated number of images/sub-frames 222, each acquired at a different focal length. During the post-processing of the image data, a user, such as an editor or director, is able to select for each playback frame $212_n$ one of the associated images/sub-frames $222_{n,m}$. In some instances, a single image/sub-frame $222_{n,x}$ (corresponding to a fixed focal length image) in the sequence of images/sub-frames may be selected by an editor or director for use in a number of playback frames $212_a$-$212_n$. An editor or director may select such a fixed focal length image for artistic reasons (e.g., in a motion picture, the focal length of the selected image/sub-frame $222_x$ may provide the optimal depth of field or degree of background defocus). In other instances, a user may select such a fixed focal length image for content reasons (e.g., in a surveillance video, the selected image/sub-frame $222_x$ may provide the clearest image of a face, vehicle, or license plate). Thus, the final sequence of production playback frames 312 can be images that have a uniform focal length.

In addition to providing a fixed focal length shot, the availability of any number of images/sub-frames 222, each acquired at a different focal length, for each respective one of the playback frames 212 permits other effects as well. For example, selection of sequential images/sub-frames 222 in sequential playback frames 212 makes possible "zoom-in" and "zoom-out" effects 320 using images acquired by the image capture device 1162 and stored in the image acquisition device nontransitory storage media 1164. Such acquired images often provide an advantageous improvement in image quality over other images in which a digitally enhanced zoom-effect is used. As depicted in FIG. 11, a "zoom-in" effect 320 may be accomplished by selecting a first image/sub-frame $222_{1,1}$ that includes low focal length (i.e., 30 mm or wide angle) image as the first production playback frame 322a, a second image/sub-frame $222_{2,2}$ that includes an intermediate focal length (i.e., 60 mm) image as the second production playback frame 322b, and a third image/sub-frame $222_{3,3}$ that includes a relatively larger focal length (i.e., 90 mm) image as the third production playback frame 322c. Focal length can be step-wise reduced from larger to smaller as well.

Figure 12:
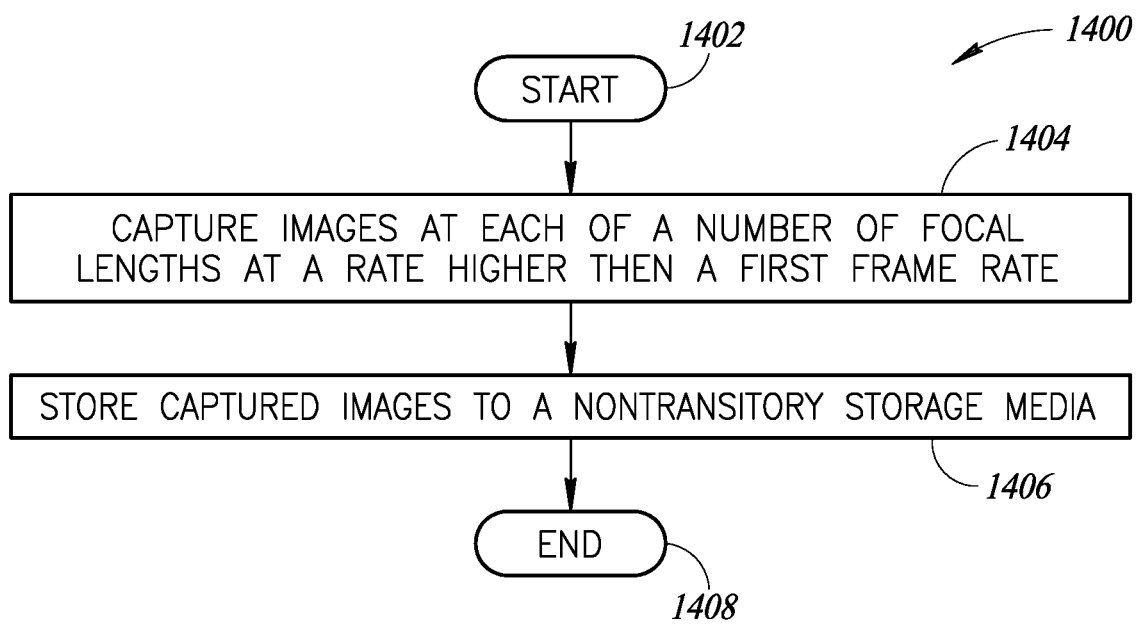
FIG. 12 is a flow diagram showing an example method of capturing a number of images at a rate higher than a first frame rate, according to at least one illustrated embodiment.

FIG. 12 is a flow diagram showing an example method 1400 of capturing a number of images in the form of images/sub-frames 222 at a rate that is higher than a first or playback frame rate 210, according to one illustrated embodiment. Although method 1400 will be discussed with reference to system 1100 of FIG. 1B, the principles illustrated in and discussed with reference to FIG. 12 are equally applicable to all systems and methods of the present disclosure, including systems 100, 2000, and 3000.

The deformable elements 1110, 1120, and 1130 in the variable focal length optical assembly 1102 permit changes to the lens focal length at a rate exceeding a first frame rate 210. In some instances, the first frame rate 210 may be a playback frame rate 210 of from about 5 frames per second to about 50 frames per second. The deformable elements 1110, 1120, and 1130 in the variable focal length optical assembly may permit changes in focal length at rates of hundreds or even thousands of times per second (e.g., 1100 Hz to 2,000 Hz). Using an image capture device 1162 having a sufficiently high capture rate it is thus possible to capture a plurality of images in the form of images/sub-frames 222 for each one of the playback frames 212. The method 1400 of capturing a number of images in the form of images/sub-frames 222 at a rate that is higher than a first or playback frame rate 210 commences at 1402.

At 1404, the image capture device 1162, for example a CMOS image sensor acquires or otherwise captures images/sub-frames 222, each at a different focal length, at a rate that exceeds a first frame rate 210. In some instances, the rate 220 at which images/sub-frames 222 are captured is limited by the rate at which the variable focal length optical assembly 1102 can change focal length. In some instances, the rate 220 at which images/sub-frames 222 are captured is limited by the rate at which the variable focal length optical assembly 1102 or the image acquisition device 1160 is able to determine and set exposure conditions to achieve a proper image exposure. In some instances, the rate 220 at which images/sub-frames 222 are captured is limited by the image data transfer rate of the image acquisition device 1160.

At 1406, the image acquisition device controller 1168 causes the transfer of image data from the image capture device 1162 to the image acquisition device nontransitory storage media 1164. Such data transfer may occur either internal or external to the image acquisition device 1160. For example, in one instance, the image acquisition device 1160 may wirelessly transfer image data via one or more networks to a remote storage device having a storage capacity significantly in excess of the native storage capacity of the image acquisition device nontransitory storage media 1164. The method 1400 of capturing a number of images/sub-frames 222 at a rate 220 that is higher than a first or playback frame rate 212 concludes at 1408.

Figure 13:
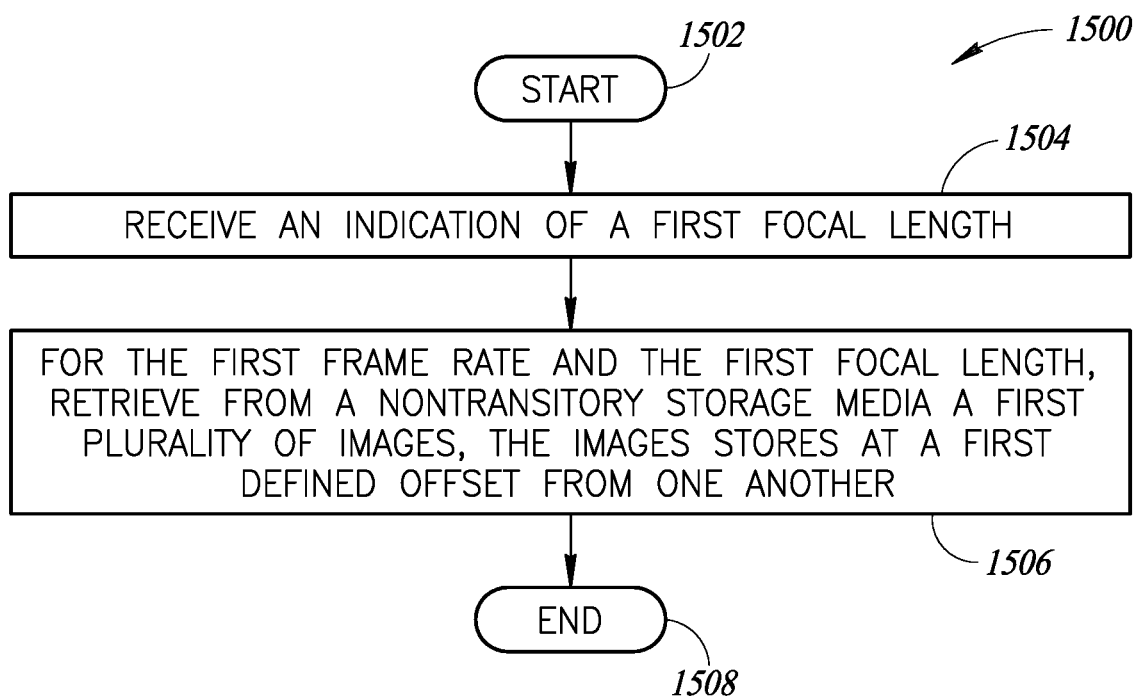
FIG. 13 is a flow diagram showing an example method of retrieving at a first frame rate a first plurality of images stored at a first defined offset from each other, according to at least one illustrated embodiment.

FIG. 13 is a flow diagram showing an example method 1500 of retrieving at a first or playback frame rate 210 a first plurality of images/sub-frames 222 stored at a first defined offset from each other, according to one illustrated embodiment. Although method 1500 will be discussed with reference to system 1100 of FIG. 1B, the principles illustrated in and discussed with reference to FIG. 13 are equally applicable to all systems and methods of the present disclosure, including systems 100, 2000, and 3000.

A plurality of images/sub-frames 222 are associated with each playback frame 212. For each playback frame $212_a$-$212_n$, each of the plurality of images/sub-frames 222 are captured at a rate 220 at a defined sequence of defined focal lengths. Thus, for each playback frame $212_a$-$212_n$, the first image/sub-frame $222_{a,1}$-$222_{n,1}$ is obtained at the same focal length. In a similar manner, every sequential image/sub-frame 222 for each playback frame 212a-212n is obtained at the same focal length. Thus, the third image/sub-frame $222_{x,3}$ for each of the playback frames 212 has been obtained at the same focal length. Thus, by selecting the third image/sub-frame $222_{x,3}$ for each playback frame 212, a motion picture taken at the first, fixed, focal length is obtained.

Since an equal number of images/sub-frames 222 are associated with each corresponding playback frame 212, the interval between images/sub-frames obtained at the same focal length is fixed. For example, if 10 images/sub-frames $222_{x,1}$-$222_{x,10}$ are associated with each playback frame $212_x$, then every tenth image/sub-frame 222 will have been obtained at the same (i.e., the first) focal length, resulting in a first defined offset of ten images/sub-frames 222. The method 1500 of retrieving at a first frame rate 210 a first plurality of images/sub-frames 222 stored at a first defined offset from each other commences at 1502.

At 1504, an input indicative of a first focal length is received. Such an input may be provided via a user interface on a post-production processing system having access to image/sub-frame $222_{n,m}$ for every playback frame $212_n$ included in a motion picture. In some instances, the input may take the form of a fixed first focal length (e.g., 50 mm).

At 1506, the image/sub-frame 222 associated with the provided focal length is retrieved from a nontransitory storage media. Such may result in the first image/sub-frame $222_{x,1}$ acquired at the first focal length being retrieved for each playback frame 212. Since the first image/sub-frame $222_{x,1}$ for each playback frame 212 is offset by the same number of images/sub-frames $222_{x,1}$ such effectively results in the retrieval of images/sub-frames stored in the nontransitory storage media 1164 at a first defined offset from each other (e.g., every tenth image/sub-frame 222). The method 1500 of retrieving at a first frame rate 210 a first plurality of images/sub-frames 222 stored at a first defined offset from each other concludes at 1508.

Figure 14:
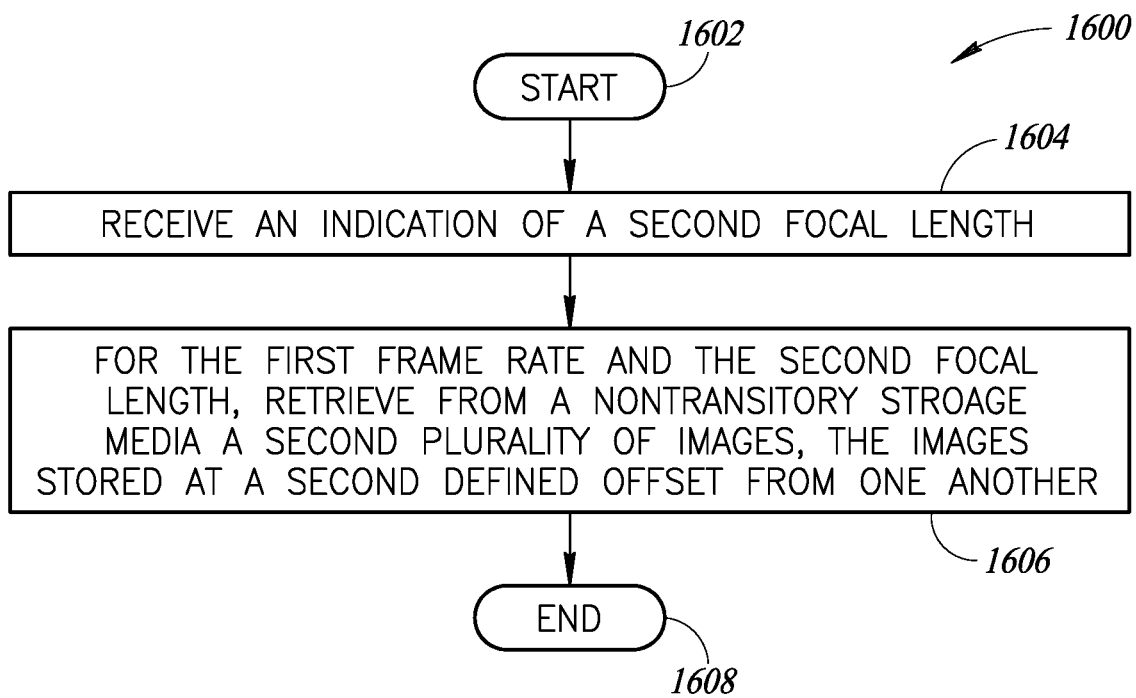
FIG. 14 is a flow diagram showing an example method of retrieving at a second frame rate a second plurality of images stored at a second defined offset from each other, according to at least one illustrated embodiment.

FIG. 14 is a flow diagram showing an example method 1600 of retrieving at a first frame rate 210 a second plurality of images/sub-frames 222 stored at a second defined offset from each other, according to one illustrated embodiment. Although method 1600 will be discussed with reference to system 1100 of FIG. 1B, the principles illustrated in and discussed with reference to FIG. 14 are equally applicable to all systems and methods of the present disclosure, including systems 100, 2000, and 3000.

A plurality of images/sub-frames 222, for example stored as data in a nontransitory storage media 1164, are associated with each playback frame 212. For each playback frame $212_a$-$212_n$, the image acquisition device 1160 acquires each of the plurality of images/sub-frames 222 each at a particular focal length in a sequence of defined focal lengths. Thus, for each playback frame $212_a$-$212_n$, the images/sub-frames $222_{a,1}$-$222_{n,1}$ are obtained at the same sequence of focal lengths. Since the images/sub-frames $222_{x,1}$-$222_{x,m}$ are acquired sequentially, the focal length of a particular image/sub-frame 222 in the sequence is identical for each of the playback frames $212_x$. Thus, by selecting the image/sub-frame $222_{x,m}$ in the sequence of images/sub-frames 222 associated with each frame $212_x$, a motion picture taken at the second, fixed, focal length is generated.

Since an equal number of sequential images/sub-frames 222 are associated with each one of the respective playback frames 212, the interval between images/sub-frames 222 obtained at the same focal length is fixed. For example, if 10 images in the form of images/sub-frames $222_{x,1}$-$222_{x,10}$ are obtained for each playback frame $212_x$, then every tenth image/sub-frame 222 will have been obtained at the same (i.e., the second) focal length, resulting in a first defined offset of ten images/sub-frames 222. The method 1600 of retrieving at the first frame rate 210 a second plurality of images/sub-frames 222 stored at a second defined offset from each other commences at 1602.

At 1604, an input indicative of a second focal length is received. Such an input may be provided via a user interface on a post-production processing system having access to data associated with every image/sub-frame $222_{n,m}$ for every playback frame $212_n$ included in a motion picture or surveillance video. In some instances, the input may take the form of a fixed second focal length (e.g., 500 mm).

At 1606, associated with the provided focal length is retrieved from a nontransitory storage media. Such may result in the tenth image/sub-frame $222_{x,10}$ acquired at the second focal length being retrieved for each playback frame 212. Since the tenth image/sub-frame $222_{x,10}$ for each playback frame 212 is offset by the same number of images/sub-frames $222_{x,1}$ from each other such effectively results in the retrieval of images/sub-frames stored in the nontransitory storage media 1164 at a second defined offset from each other (e.g., every tenth image/sub-frame 222). The method 1600 of retrieving at a first frame rate 210 a second plurality of images/sub-frames 222 stored at a second defined offset from each other concludes at 1608.

Figure 15:
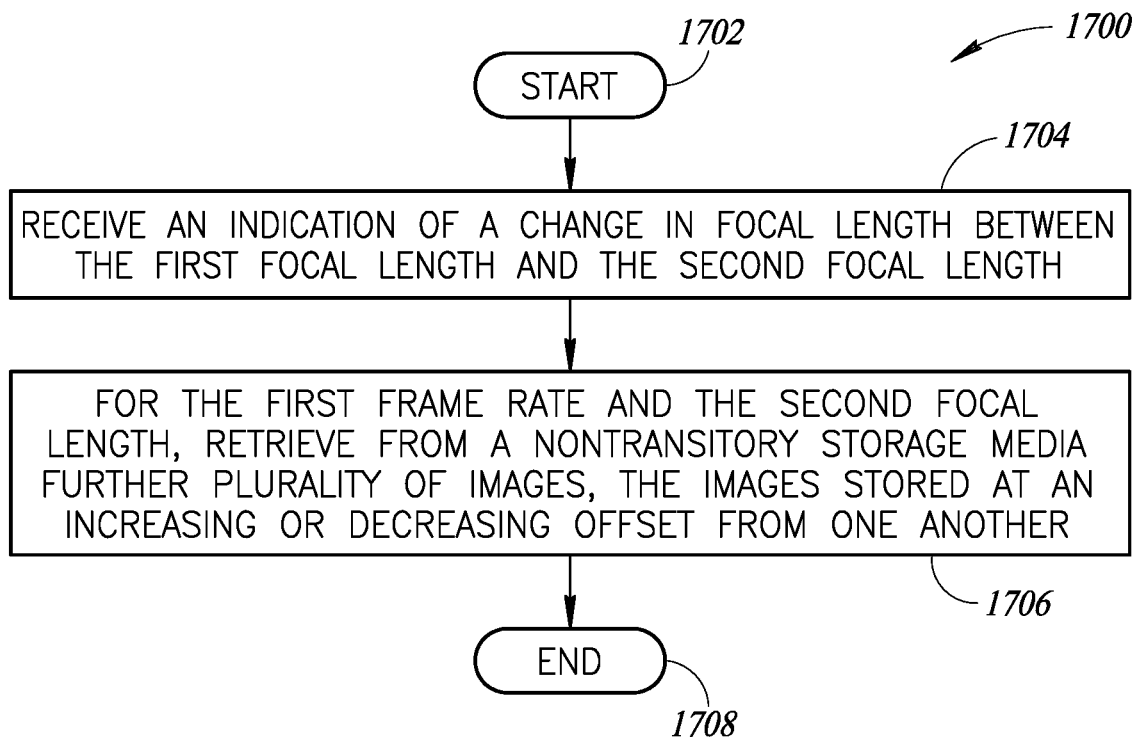
FIG. 15 is a flow diagram showing an example method of receiving a change from a first focal length to a second focal length and retrieving a plurality of images stored at either an increasing or decreasing offset from each other, according to at least one illustrated embodiments.

FIG. 15 is a flow diagram showing an example method 1700 of retrieving at a first frame rate 210 a further plurality of images/sub-frames 222 stored at an increasing or decreasing offset from each other, according to one illustrated embodiment. By way of example, a series of images/sub-frames $222_{x,1}$-$222_{x,10}$ associated each playback frame $212_x$ may be stored in a nontransitory storage medium as follows:

TABLE 1

Hypothetical Image Focal Length by Image/Sub-Frame 222

| Image/Subframe ID | Focal Length |
|---|---|
| $222_{x,1}$ | 50 mm |
| $222_{x,2}$ | 100 mm |
| $222_{x,3}$ | 150 mm |
| $222_{x,4}$ | 200 mm |
| $222_{x,5}$ | 250 mm |
| $222_{x,6}$ | 300 mm |
| $222_{x,7}$ | 350 mm |
| $222_{x,8}$ | 400 mm |
| $222_{x,9}$ | 450 mm |
| $222_{x,10}$ | 500 mm |

If 50 mm is selected as a first focal length and 500 mm is selected as a second focal length, then the first image/sub-frame $222_{x,1}$ associated with each playback frame $212_x$ provides the image at the first focal length. Similarly, the tenth image/sub-frame $222_{x,10}$ associated with each playback frame $212_x$ provides an image at the second focal length. Images/sub-frames $222_{x,2}$-$222_{x,9}$ at intermediate focal lengths are provided for each playback frame $212_x$. The availability of these intermediate focal length images/sub-frames $222_{x,2}$-$222_{x,9}$ makes it possible to zoom between the first focal length and the second focal length. The illustrative method 1700 of retrieving at a first frame rate 210 a further plurality of images/sub-frames 222 stored at an increasing or decreasing offset from each other commences at 1702.

At 1704, an input indicative of a change (i.e., a zoom) in focal length between a first focal length (e.g., 50 mm) and a second focal length (e.g., 500 mm) is received. Such an input may be provided via a user interface on a post-production processing system having access to data associated with every image/sub-frame $222_{n,m}$ for every playback frame $212_n$ included in a motion picture or surveillance video.

At 1706, a further plurality of images/sub-frames 222 is retrieved from the nontransitory storage media (e.g., media 1164). The selected first focal length and second focal length are indicative of a user's desire for a zoom-in effect or a zoom-out effect. For a zoom-in effect, the offset between the retrieved images/sub-frames 222 is increased, causing the focal length of the retrieved images/sub-frames 222 to gradually increase (i.e., in 50 mm increments from 50 mm to 300 mm based on the example data in Table 1). For a zoom-out effect, the offset between the retrieved images/sub-frames 222 is decreased, causing the focal length of the retrieved images/sub-frames 222 to gradually decrease (i.e., in 50 mm increments from 300 mm to 50 mm based on the example data in Table 1). The method 1700 of retrieving at a first frame rate 212 a further plurality of images in the form of sub-frames 222 stored at an increasing or decreasing offset from each other concludes at 1708.

Figure 16:
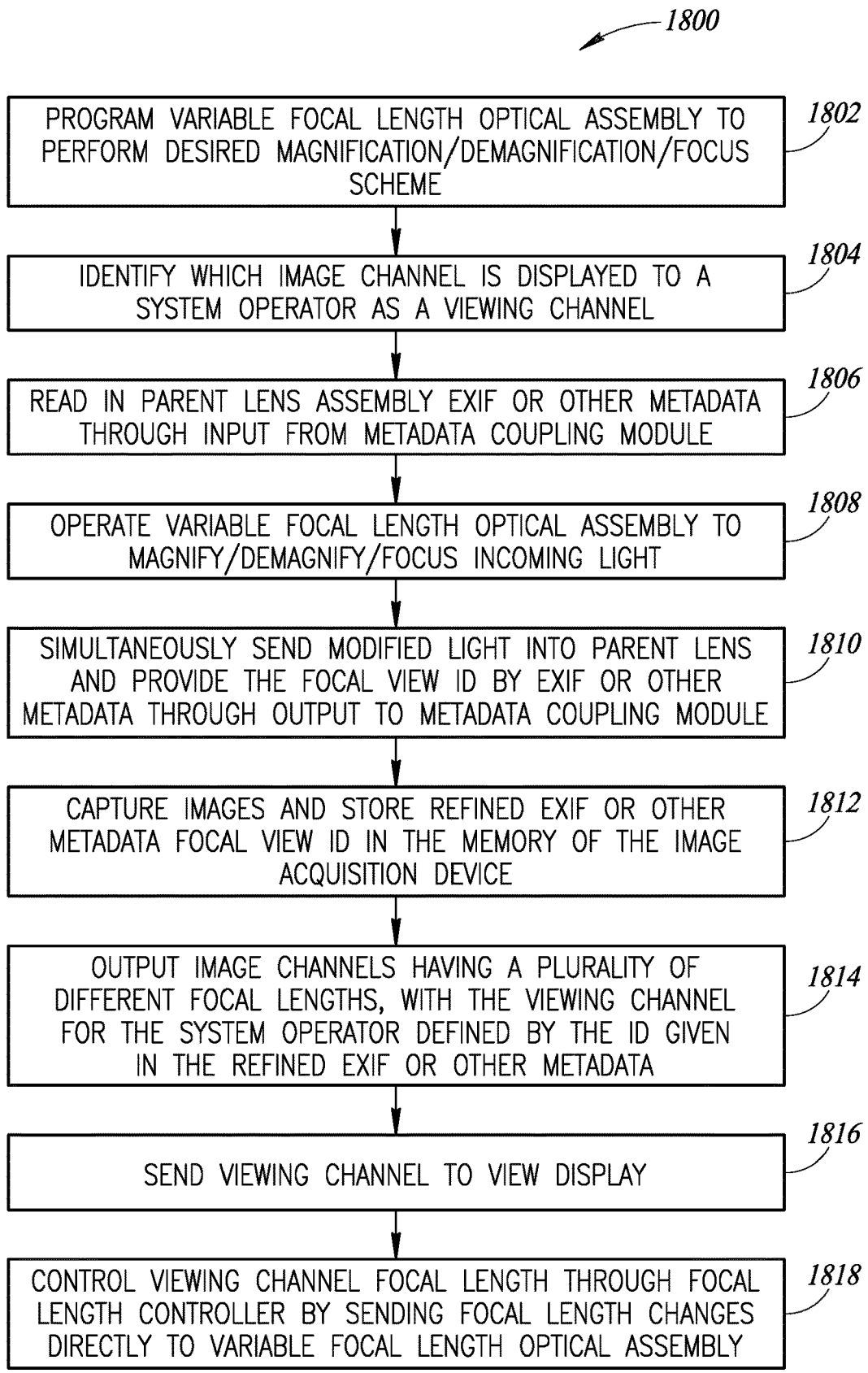
FIG. 16 is a flow diagram showing an example method to operate an optical system that includes a variable focal length optical assembly positioned prior to a parent lens assembly in an optical path, according to at least one illustrated embodiment.

FIG. 16 is a flow diagram showing an example method 1800 to operate an optical system that includes a variable focal length optical assembly positioned prior to a parent lens assembly in an optical path, according to at least one illustrated embodiment. Although method 1800 will be discussed with reference to system 2000 of FIG. 2, method 1800 can be performed by other systems of the present disclosure, as well. In particular, aspects of method 1800 will be discussed as implemented by a controller that controls and/or is a component of the variable focal length optical assembly 102, but can be implemented by one or more other components of the system 2000. Method 1800 begins at 1802.

At 1802, the variable focal length assembly controller programs the variable focal length optical assembly 102 to perform a desired magnification, demagnification, and/or focusing scheme. For example, the variable focal length assembly controller can load or retrieve from a non-transitory memory a set instructions that, when executed by the controller, cause the controller to implement a sequence of deformations of one or more deformable optical elements to dynamically change a focal length provided by the variable focal length optical assembly 102.

At 1804, the variable focal length assembly controller identifies which image channel is displayed to a system operator as a viewing channel.

At 1806, the variable focal length assembly controller reads in EXIF data or other metadata associated with the parent lens assembly 104 through input from the metadata coupler 106. For example, the metadata coupler 106 may receive input from the parent lens assembly 104 that describes the current focal length provided by the parent lens assembly 104 and the metadata coupler 106 may convey such information to the variable focal length assembly controller. Alternatively, the focal length provided by the parent lens assembly 104 may be static and the metadata coupler 106 has such static focal length stored in memory.

Thus, at 1806, the variable focal length assembly controller obtains the focal length of the parent lens assembly 104 from the metadata coupler 106. Alternatively or additionally, the variable focal length assembly controller can obtain the focal length of the parent lens assembly 104 directly from the parent less assembly 104.

At 1808, the variable focal length assembly controller operates the variable focal length optical assembly 102 to magnify, demagnify, or otherwise focus incoming light. For example, the instructions loaded at 1802 can be executed to dynamically deform one or more deformable elements of the variable focal length optical assembly 102.

At 1810, the variable focal length assembly controller provides focal view ID information to the metadata coupler 106 while light modified by the variable focal length optical assembly 102 is simultaneously sent into the parent lens assembly 104. For example, the controller can format the focal view ID information as EXIF data or otherwise include the ID information as or within other forms of metadata.

Thus, at 1810, the variable focal length assembly controller respectively generates focal length metadata to be associated with each of a plurality of images captured by the system 2000. The controller generates the focal length metadata based at least in part on the focal length value of the parent lens assembly 104 obtained at 1806 and a plurality of second focal length values that respectively describe a plurality of different focal lengths of the variable focal length optical assembly 102 at respective times. As an example, for each different focal length provided by the variable focal length optical assembly 102, the variable focal length assembly controller can revise or adjust the focal length of the parent lens assembly 104 that was obtained at 1806 to create a new focal length ID for the image captured while the variable focal length optical assembly 102 provided such focal length. The variable focal length assembly controller communicates the refined metadata to one or both of the metadata coupler 106 and a controller of an image acquisition device that includes the image capture device 156.

At 1812, the system 2000 captures images and stores the refined EXIF or other focal view ID metadata in a non-transitory memory. In particular, the metadata coupler 106 can associate the refined metadata received from the variable focal length assembly controller with each image. For example, the respective metadata can be stored alongside or as a portion of each image file.

At 1814, the system 2000 outputs image channels having a plurality of different focal lengths, with the viewing channel for the system operator defined by the ID given in the refined EXIF data or other metadata.

At 1816, the system 2000 sends the viewing channel to the view display 165. At 1818, the system 2000 controls the viewing channel focal length based on user input via focal length controller 144. As one example, focal length changes requested by the operator can be sent directly to the variable focal length assembly controller which in response adjusts the focal lengths provided by the variable focal length optical assembly 102.

Method 1800 ends after 1818.

Figure 17:
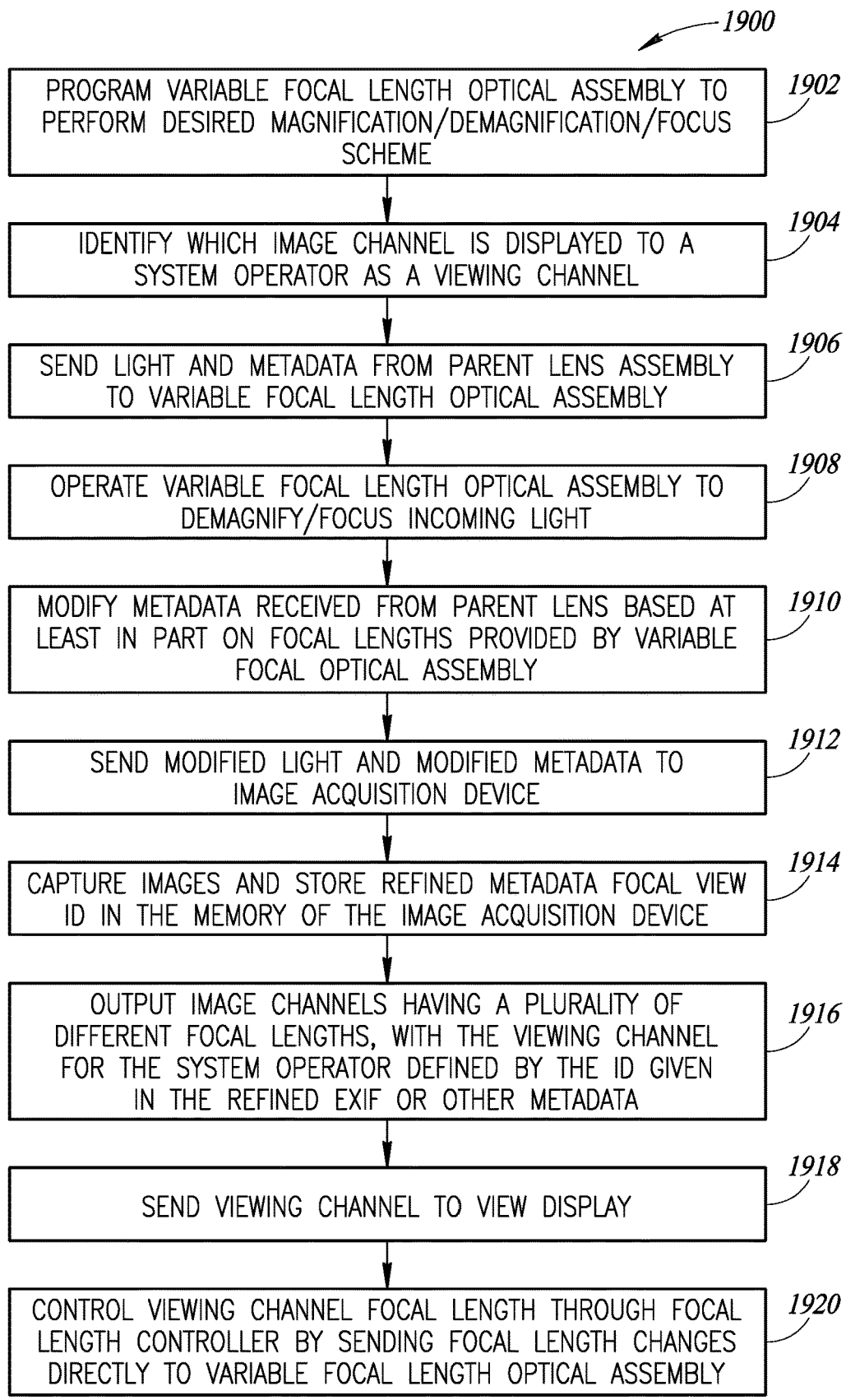
FIG. 17 is a flow diagram showing an example method to operate an optical system that includes a parent lens assembly positioned prior to a variable focal length optical assembly in an optical path, according to at least one illustrated embodiment.

FIG. 17 is a flow diagram showing an example method 1900 to operate an optical system that includes a parent lens assembly positioned prior to a variable focal length optical assembly in an optical path, according to at least one illustrated embodiment. Although method 1900 will be discussed with reference to system 3000 of FIG. 3, method 1900 can be performed by other systems of the present disclosure, as well. In particular, method 1900 will be discussed as implemented by a controller that controls and/or is a component of the variable focal length optical assembly 102, but can be implemented by one or more other components of the system 3000. Method 1900 begins at 1902.

At 1902, the variable focal length assembly controller programs the variable focal length optical assembly 102 to perform a desired demagnification and/or focusing scheme. For example, the variable focal length assembly controller can load or retrieve from a non-transitory memory a set instructions that, when executed by the controller, cause the controller to implement a sequence of deformations of one or more deformable optical elements to dynamically change a focal length provided by the variable focal length optical assembly 102.

At 1904, the variable focal length assembly controller identifies which image channel is displayed to a system operator as a viewing channel.

At 1906, the parent lens assembly 104 sends metadata to the variable focal length assembly controller. In particular, the metadata can describe a current focal length of the parent lens assembly. Simultaneously, light that has exited the parent lens assembly 104 enters the variable focal length optical assembly 102.

At 1908, the variable focal length assembly controller operates the variable focal length optical assembly 102 to demagnify and/or focus incoming light. For example, the instructions loaded at 1902 can be executed to dynamically deform one or more deformable elements of the variable focal length optical assembly 102.

At 1910, the variable focal length assembly controller modifies the metadata received at 1906 based at least in part on the different focal lengths dynamically provided by the variable focal length optical assembly 102. As an example, for each different focal length provided by the variable focal length optical assembly 102, the variable focal length assembly controller can revise or adjust the focal length of the parent lens assembly 104 that was received at 1906 to create a new focal length ID for the image captured while the variable focal length optical assembly 102 provided such focal length.

At 1912, the variable focal length optical assembly 102 sends the modified light and the modified metadata to an image acquisition device that includes the image capture device 165. For example, the variable focal length assembly controller can communicate the refined metadata to a controller of the image acquisition device that includes the image capture device 156.

At 1914, the system 3000 captures images and stores the refined EXIF or other focal view ID metadata in a non-transitory memory. In particular, the refined metadata received from the variable focal length assembly controller can be respectively logically associated with each image. For example, the respective metadata can be stored alongside or as a portion of each image file.

At 1916, the system 3000 outputs image channels having a plurality of different focal lengths, with the viewing channel for the system operator defined by the ID given in the refined EXIF data or other metadata.

At 1918, the system 3000 sends the viewing channel to the view display 165. At 1920, the system 3000 controls the viewing channel focal length based on user input via focal length controller 144. As one example, focal length changes requested by the operator can be sent directly to the variable focal length assembly controller which in response adjusts the focal lengths provided by the variable focal length optical assembly 102.

Method 1900 ends after 1920.

Figure 18:
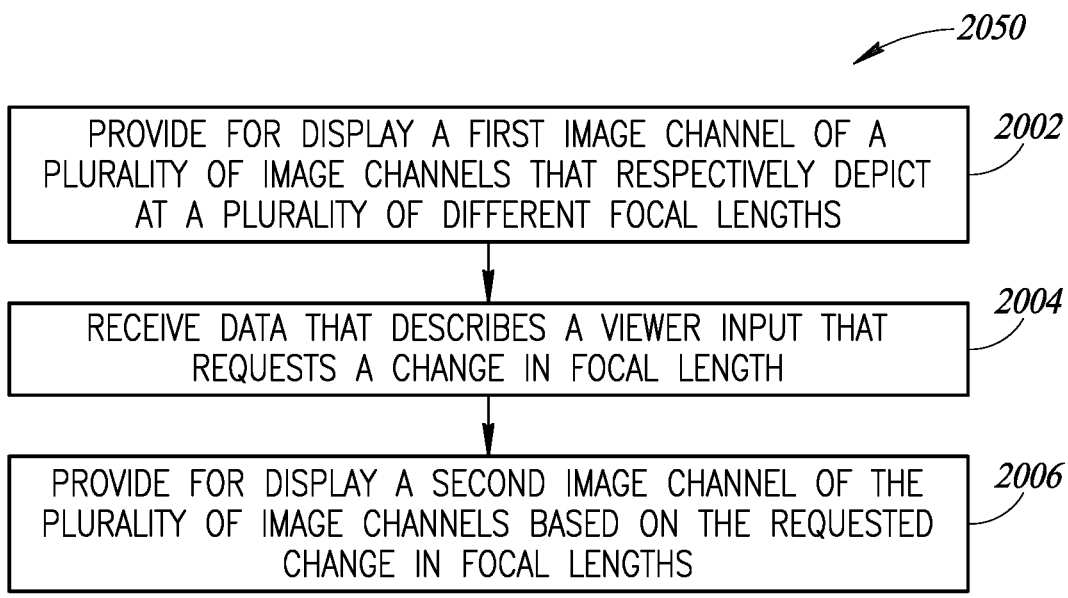
FIG. 18 is a flow diagram showing an example method to provide a plurality of image channels for display, according to at least one illustrated embodiment.

FIG. 18 is a flow diagram showing an example method 2050 to provide a plurality of image channels for display, according to at least one illustrated embodiment. Method 2050 begins at 2002.

At 2002, a component of an image channel provisioning system provides for display a first image channel of a plurality of image channels that respectively depict a scene at a plurality of different focal lengths. For example, the plurality of image channels may have a frame rate (e.g., 48 fps) and each image channel may include one image at the particular focal length for such channel per frame.

As one example, the plurality of image channels may have been concurrently captured by an optical system that includes a single image acquisition device in optical communication with a variable focal length optical assembly comprising at least one deformable optical element. The variable focal length optical assembly may be operable to capture images at each of the plurality of different focal lengths within a single frame of the frame rate.

The first image channel can be displayed on any suitable display element such as a television, a computer monitor, a user interface of an image acquisition device, or other display elements.

At 2004, a component of the image channel provisioning system receives data that describes a viewer input that requests a change in focal length. For example, the view input can have been received through a viewer input device such as a focal length controller, a television remote control, portions of a user interface of an image acquisition device, or other input devices. The viewer input can specify a certain desired focal length or can generically request a relatively higher or relatively lower focal length.

At 2006, in response to and based on the viewer input, a component of the image channel provisioning system provides for display on the display element a second image channel of the plurality of image channels. The second image channel has a different focal length than the first image channel. The second image channel may have a focal length specifically requested by the viewer input.

Thus, in one example application, a television viewer may be empowered to selectively change the focal length of the content provided on the television (i.e., by selectively changing the image channel provided to the television). Thus, the viewer is given additional control over and interaction with the content. The viewer can select different focal lengths at which to view the same content (e.g., to focus on different aspects of the content occurring at different focal lengths). Such may advantageously increase user interaction with, customization of, and/or enjoyment from visual content.

In another implementation, each image channel selectable by the viewer may not have a fixed focal length. Thus, a particular image channel may have a dynamic focal length that "zooms" in or out or otherwise changes focal length over time (e.g., by selectively switching between images provided from image streams of fixed focal length). Each image channel may be programmed or designed to provide independent and unique fixed or dynamic focal lengths versus other image channels.

Figure 19:
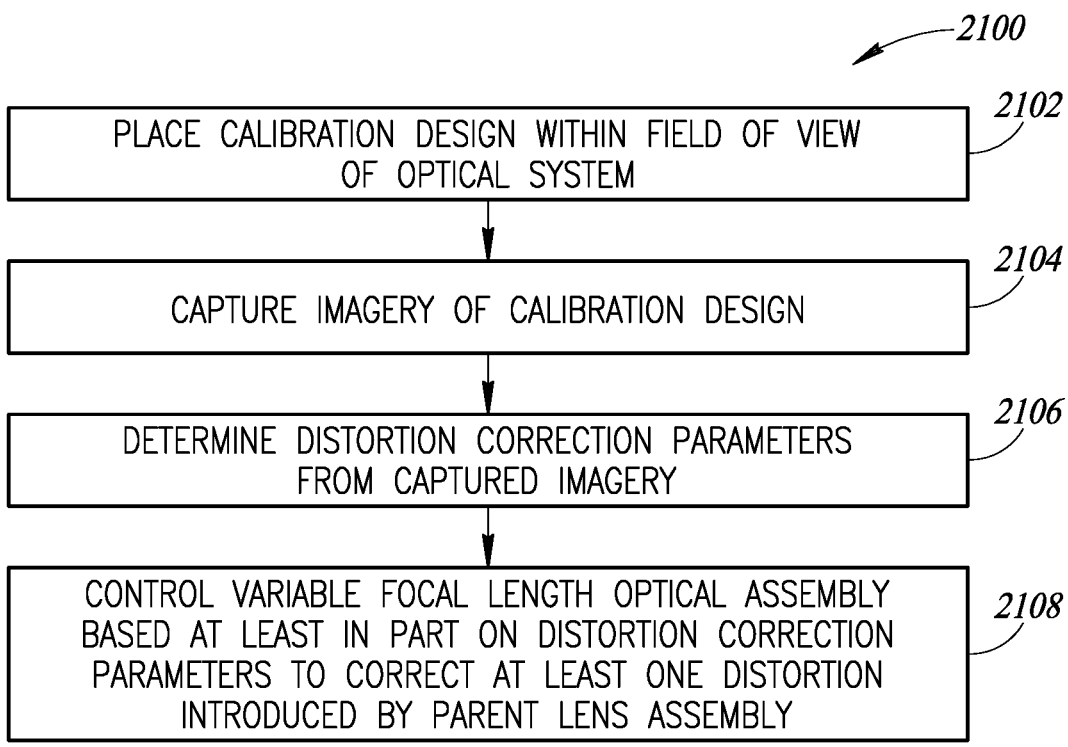
FIG. 19 is a flow diagram showing an example method to eliminate an optical distortion, according to at least one illustrated embodiment.

FIG. 19 is a flow diagram showing an example method 2100 to eliminate an optical distortion, according to at least one illustrated embodiment. Method 2100 begins at 2102.

At 2102, a calibration design is placed within a field of view of an optical system. For example, the calibration design can be manually positioned in front of the optical system. Alternatively, the optical system can be positioned so that its field of view includes the calibration design. The optical system can include a variable focal length optical assembly.

The calibration design has one or more known patterns or other optical elements. As one example, the calibration design can be a checkerboard pattern having known dimensions.

At 2104, the optical system operates the capture imagery of the calibration design. The imagery can include distortions introduced by components of the optical system, including, for example, a parent lens assembly.

At 2106, one or more distortion correction parameters can be determined through an analysis of the captured imagery. For example, an amount or degree and location of distortion can be identified and necessary optical adjustments for correcting such distortion can be calculated.

At 2108, the optical system controls the variable focal length optical assembly based at least in part on the distortion correction parameters to correct the at least one distortion introduced, for example, by the parent lens assembly. For example, one or more deformable elements can be deformed to a shape that counteracts the introduced distortion. For example, one or more deformable reflective elements can be deformed to provide case-specific distortion inversion.

Thus, method 2100 leverages a variable focal length optical assembly to reduce or eliminate distortions introduced by other components of the optical system, such as a barrel distortion introduced by the parent lens assembly.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary communication service provider systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and/or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as floppy disks, hard disk drives, CD ROMs, digital tape, and computer memory; and other non-transitory computer-readable storage media.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, if any, including but not limited to U.S. Provisional Patent Application No. 62/000,865, titled "DYNAMICALLY VARIABLE FOCAL LENGTH LENS ASSEMBLY AND RELATED METHODS, filed May 20, 2014 are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
    capturing a first plurality of images at a first number of frames per second with a variable focal length optical assembly optically coupleable to a single image sensor, the variable focal length optical assembly including:
    a first deformable reflective element
    a second deformable reflective element and
    a set of actuators operable to selectively electromagnetically deform the first deformable reflective element and the second deformable reflective element to selectively vary a focal length of the variable focal optical assembly;
    transmitting signals to the set of actuators via a processor of the variable focal length optical assembly that cause the set of actuators to deform at least one of the first deformable reflective element and the second deformable reflective element at a rate that is higher than the first number of frames per second to provide a plurality of image channels, the first plurality of images corresponding to a first image channel of the plurality of image channels, each image channel of the plurality of image channels respectively depicting a scene at a respective one of a plurality of different focal lengths;
    concurrently capturing a second plurality of images at the first number of frames per second with the single image sensor, the second plurality of images corresponding to a second image channel of the plurality of image channels;
    concurrently capturing a third plurality of images at the first number of frames per second with the single image sensor, the third plurality of images corresponding to a third image channel of the plurality of image channels; and
    storing the first plurality of images, the second plurality of images, and the third plurality of images to a nontransitory processor-readable medium.

2. The method of claim 1, wherein transmitting signals to the set of actuators via the processor of the variable focal length optical assembly includes transmitting signals that cause the set of actuators to deform the at least one of the first deformable reflective element and the second deformable element of the variable focal length optical assembly between a plurality of positions corresponding to the focal length for each of the first plurality of images.

3. The method of claim 1, further comprising:
displaying the first image channel of the plurality of image channels, including depicting the scene at a first focal length;
receiving viewer input data requesting a change in focal length; and
displaying the second image channel of the plurality of image channels in response to the viewer input data, including depicting the scene at a second focal length.

4. The method of claim 1, further comprising:
receiving an indication of a first focal length; and
retrieving from the nontransitory processor-readable medium a fourth plurality of images at the first focal length for a plurality of frames moving at the first number of frames per second.

5. The method of claim 4, further comprising:
receiving an indication of a second focal length; and
retrieving from the nontransitory processor-readable medium a fifth plurality of images at the second focal length for a plurality of frames moving at the first number of frames per second.

6. The method of claim 5, further comprising:
receiving an indication of a change in focal length between the first focal length and the second focal length; and
retrieving from the nontransitory processor-readable medium a sixth plurality of images for the first number of frames per second and the second focal length, images of the sixth plurality of images being stored at an increasing or decreasing offset from one another.

7. A method, comprising:
capturing a plurality of images at a plurality of different focal lengths for a plurality of frames that are moving at a first number of frames per second with a variable focal length optical assembly optically coupleable to a single image sensor, the variable focal length optical assembly including:
a first deformable reflective element
a second deformable reflective element
a set of actuators operable to selectively electromagnetically deform the first deformable reflective element and the second deformable reflective element to selectively vary a focal length of the variable focal optical assembly; and
a processor that is communicatively coupled to the single image sensor and to the set of actuators, the processor transmitting signals to one or more actuators in the set of actuators that cause the one or more actuators to deform at least one of the first deformable reflective element and the second deformable reflective element at a rate that is higher than the first number of frames per second to provide a plurality of image channels that are concurrently captured by the single image sensor, each image channel respectively depicting a scene at a respective one of the plurality of different focal lengths;
storing the plurality of images to a nontransitory processor-readable medium;
receiving an indication of a first focal length of the plurality of different focal lengths; and
retrieving from the nontransitory processor-readable medium a first plurality of images of the plurality of images for the first number of frames per second and the first focal length.

8. The method of claim 7, further comprising:
receiving an indication of a second focal length of the plurality of different focal lengths; and
retrieving from the nontransitory processor-readable medium a second plurality of images for the first number of frames per second and the second focal length.

9. The method of claim 8, further comprising:
receiving an indication of a change in focal length between the first focal length and the second focal length; and
retrieving from the nontransitory processor-readable medium a third plurality of images for the first number of frames per second and the second focal length, including storing images of the third plurality of images at an increasing or decreasing offset from one another.

10. The method of claim 7, wherein capturing the plurality of images further includes:
capturing the first plurality of images for a first frame at the first focal length;
concurrently capturing a second plurality of images at a second focal length for a second frame; and
concurrently capturing a third plurality of images at a third focal length for a third frame.

11. The method of claim 7, further comprising:
displaying a first image channel of the plurality of image channels, the first image channel corresponding to the first plurality of images of the plurality of images at the first focal length of the plurality of different focal lengths;
receiving data that describes a viewer input that requests a change in focal length; and
displaying a second image channel of the plurality of image channels in response to the viewer input, the second image channel corresponding to a second plurality of images of the plurality of images at a second focal length of the plurality of different focal lengths.

12. A method, comprising:
capturing a plurality of image channels at a plurality of different focal lengths concurrently with a variable focal length optical assembly optically coupleable to a single image sensor, including concurrently capturing a plurality of images of a scene at the plurality of different focal lengths with the single image sensor for a plurality of frames that are moving at a first number of frames per second, the variable focal length optical assembly including:
a first deformable reflective element mounted to the housing;
a second deformable reflective element mounted to the housing;
a set of actuators operable to selectively electromagnetically deform the first deformable reflective element and the second deformable reflective element to selectively vary a focal length of the variable focal optical assembly; and
a processor that is communicatively coupled to the single image sensor and to the set of actuators, the processor transmitting signals to one or more actuators in the set of actuators that cause the one or more actuators to deform at least one of the first deformable reflective element and the second deformable reflective element at a rate that is higher than the first number of frames per second to provide the plurality of image channels that are concurrently captured by the single image sensor, each image channel respectively depicting the scene at a respective one of the plurality of different focal lengths;

displaying a first image channel of the plurality of image channels, including depicting the scene at a first focal length of the plurality of different focal lengths;

receiving data that describes a viewer input that requests a change in focal length; and displaying a second image channel of the plurality of image channels in response to the viewer input, including depicting the scene at a second focal length of the plurality of different focal lengths.

13. The method of claim 12, wherein capturing the plurality of images of the scene includes adjusting the focal length of the variable focal length optical assembly for a plurality of frames that are moving at the first number of frames per second.

14. The method of claim 12, further comprising:

storing the plurality of images of the scene to a nontransitory processor-readable medium;

receiving an indication of the first focal length of the plurality of different focal lengths; and retrieving from the nontransitory processor-readable medium the first plurality of images of the plurality of images depicting the scene at the first focal length for a plurality of frames moving at the first number of frames per second.

15. The method of claim 14, further comprising:

receiving an indication of a second focal length of the plurality of different focal lengths; and retrieving from the nontransitory processor-readable medium a second plurality of images of the plurality of images depicting the scene at the second focal length for the plurality of frames at the first number of frames per second.

16. The method of claim 14, wherein storing the plurality of images of the scene to the nontransitory processor-readable medium includes wirelessly transmitting data corresponding to the plurality of images from the single image sensor to the nontransitory processor-readable medium.

17. The method of claim 12, wherein receiving data that describes the viewer input that requests the change in focal length includes receiving data directly at the variable focal length optical assembly from a focal length controller.

* * * * *